United States Patent
Dadkhah Tehrani et al.

(10) Patent No.: US 12,153,444 B2
(45) Date of Patent: Nov. 26, 2024

(54) ROUTE PLANNING AMONG NO-FLY ZONES AND TERRAIN

(71) Applicant: Lockheed Martin Corporation, Bethesda, MD (US)

(72) Inventors: Navid Dadkhah Tehrani, Providence, RI (US); Brian Henri LeFloch, Redondo Beach, CA (US); Brian Scott MacAllister, Jr., East Taunton, MA (US); Suraj Unnikrishnan, Palo Alto, CA (US); Igor Cherepinksy, Sandy Hook, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 284 days.

(21) Appl. No.: 17/178,927

(22) Filed: Feb. 18, 2021

(65) Prior Publication Data

US 2022/0269290 A1    Aug. 25, 2022

(51) Int. Cl.
*G05D 1/00* (2024.01)
*G01C 21/20* (2006.01)
(Continued)

(52) U.S. Cl.
CPC ............ *G05D 1/101* (2013.01); *G01C 21/20* (2013.01); *G05D 1/0088* (2013.01); *G05D 1/102* (2013.01);
(Continued)

(58) Field of Classification Search
CPC .... G08G 5/0034; G08G 5/045; G08G 5/0039; G08G 5/006; G05D 1/101; G05D 1/0088; G01C 21/20
See application file for complete search history.

(56) References Cited

U.S. PATENT DOCUMENTS

2019/0310644 A1* 10/2019 Zhang .............. G01C 21/3453
2020/0020237 A1*  1/2020 Grimald ............... G08G 5/006
(Continued)

FOREIGN PATENT DOCUMENTS

| CN | 105841702 A | 8/2016 |
|----|-------------|--------|
| CN | 106595663 A | 4/2017 |

(Continued)

OTHER PUBLICATIONS

Machine Translation of JP2020077387A (Year: 2020).*
(Continued)

*Primary Examiner* — Anne Marie Antonucci
*Assistant Examiner* — Jordan T Smith
(74) *Attorney, Agent, or Firm* — Foley & Lardner LLP

(57) ABSTRACT

A technique relates to route planning. Points associated with a start location and a destination location are received. It is determined whether the points comprise one or more hard points, one or more soft points, or both. At least one obstruction to avoid is determined. A route is autonomously generated comprising the points and segments associated with the points, the segments comprising rhumb lines, great-circle arcs, or both. Responsive to the points comprising the one or more soft points, the at least one obstruction is avoided by permitting a distance associated with the one or more soft points to be reached and adding at least one free waypoint. Responsive to the points comprising the one or more hard points, the at least one obstruction is avoided by requiring the one or more hard points to be reached and adding the at least one free waypoint.

10 Claims, 14 Drawing Sheets

(51) Int. Cl.
*G08G 5/00* (2006.01)
*G08G 5/04* (2006.01)
*B64C 27/06* (2006.01)

(52) U.S. Cl.
CPC ........... *G08G 5/0039* (2013.01); *G08G 5/006* (2013.01); *G08G 5/045* (2013.01); *B64C 27/06* (2013.01)

(56) References Cited

U.S. PATENT DOCUMENTS

| | | | | |
|---|---|---|---|---|
| 2020/0105147 | A1* | 4/2020 | Bailey | G08G 5/0052 |
| 2021/0041242 | A1* | 2/2021 | Miller | G06F 3/0485 |
| 2021/0287559 | A1* | 9/2021 | Jeong | G05D 1/0022 |
| 2022/0415187 | A1* | 12/2022 | Borgyos | G06Q 50/30 |

FOREIGN PATENT DOCUMENTS

| | | | |
|---|---|---|---|
| CN | 109269502 A | 1/2019 | |
| CN | 109683630 A | 4/2019 | |
| CN | 109947129 A | 6/2019 | |
| CN | 110544296 A | 12/2019 | |
| DE | 10 2018 120 675 A1 | 2/2020 | |
| JP | 2020077387 A * | 5/2020 | ............ G01C 21/20 |

OTHER PUBLICATIONS

Zhu Hongguo, Zheng Changwen, Hu Xiaohui and Li Xiang, "Path planner for unmanned aerial vehicles based on modified PSO algorithm," 2008 International Conference on Information and Automation, Changsha, China, 2008, pp. 541-544, doi: 10.1109/ICINFA.2008.4608059. (Year: 2008).*
Extended European Search Report on European Patent Application No. 22153268.2 dated Sep. 15, 2022 (9 pages).
Chen, "Locust Swarms—A New Multi-Optima Search Technique", IEEE, (2009), pp. 1745-1752.
Kennedy et al., "Particle Swarm Optimization", IEEE, (1995), pp. 1942-1948.

* cited by examiner

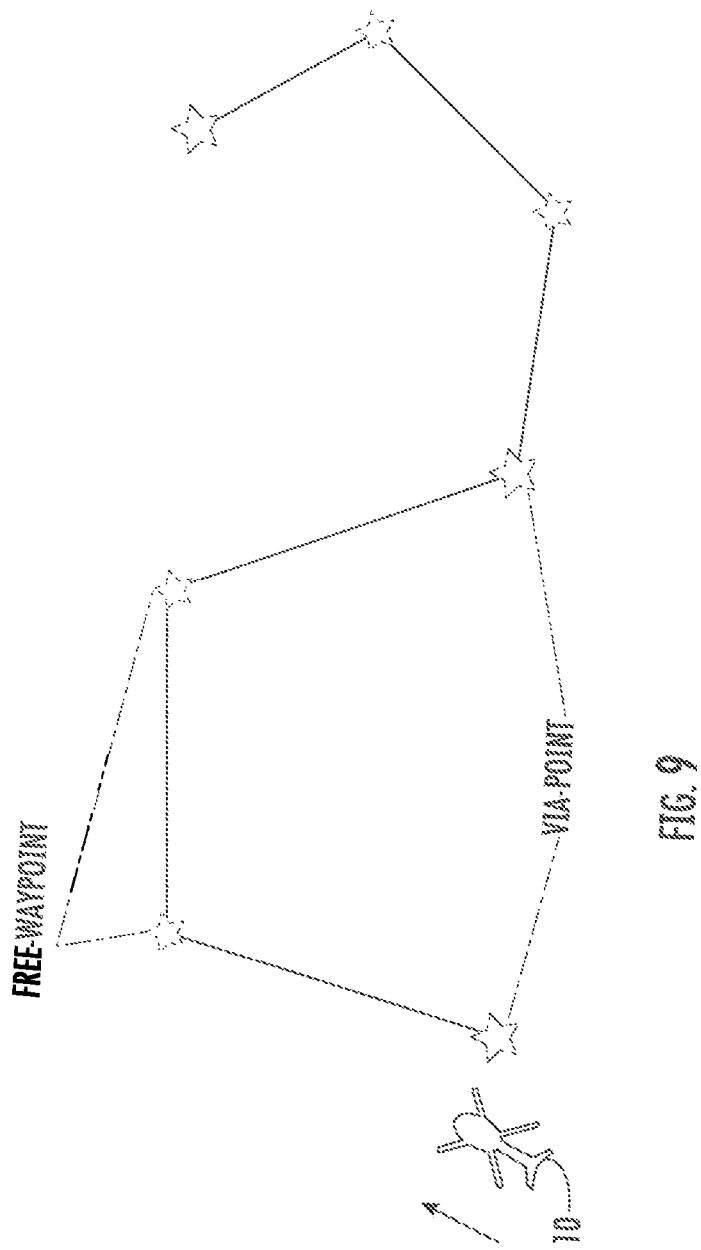

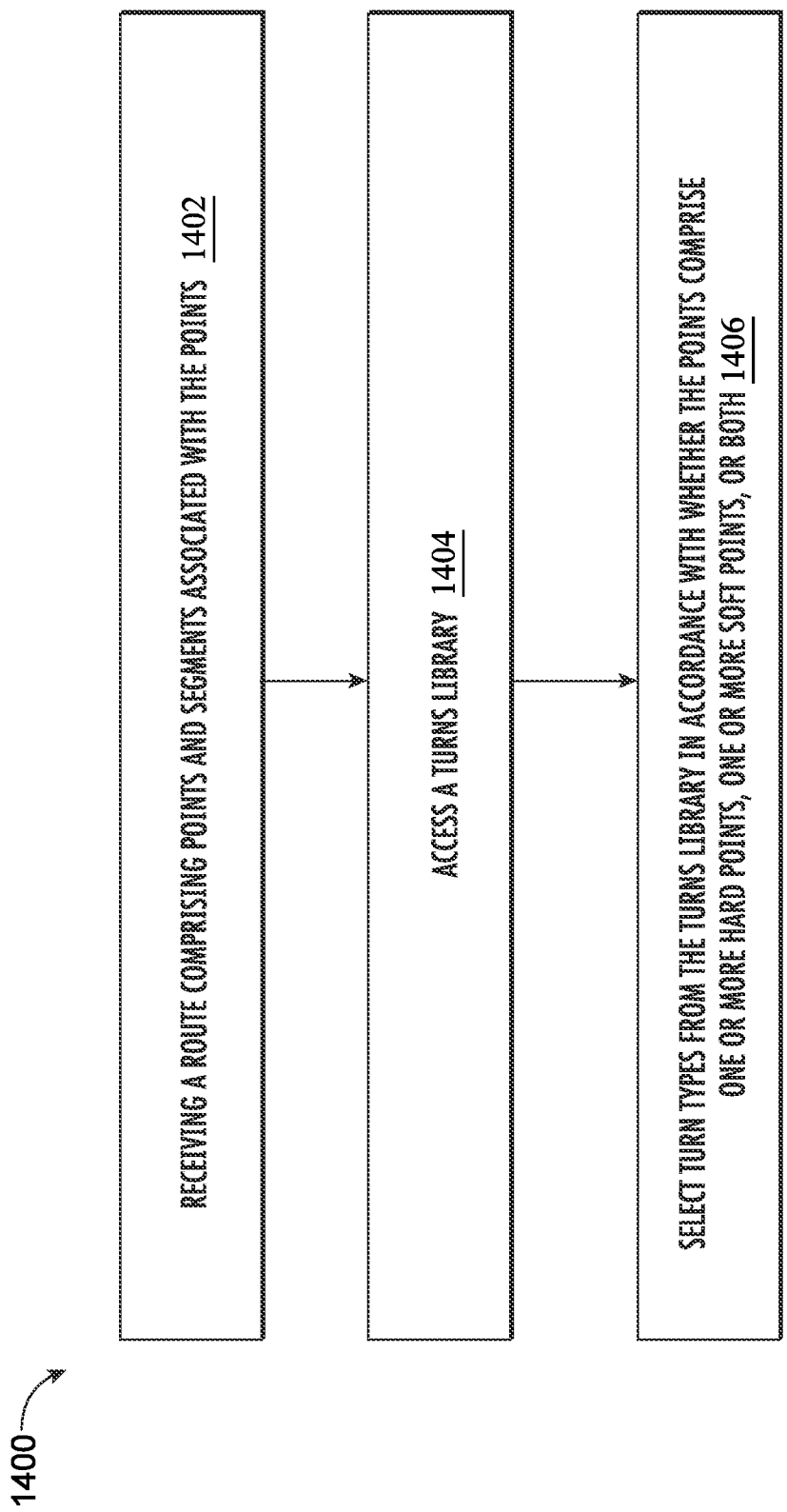

ROUTE PLANNING AMONG NO-FLY ZONES AND TERRAIN

BACKGROUND

Exemplary embodiments relate to the art of rotary or fixed wing aircraft, and more particularly, to autonomous global route planning among no-fly zones and terrain.

BRIEF SUMMARY OF THE DISCLOSURE

According to one or more embodiments, a method for route planning is provided. The method comprises receiving points associated with a start location and a destination location, determining whether the points comprise one or more hard points, one or more soft points, or both, and determining at least one obstruction to avoid. A hard point represents a first location through which a route is to pass. A soft point represents a second location associated with a region, defined by a corresponding non-zero radius or distance from the second location, through which the route is to pass. The hard point and soft point can be in any order (e.g., the hard point can come before or after the soft point, or there can be other intervening points in between the hard and soft points). The method includes autonomously generating a route comprising the points and segments associated with the points, the segments comprising rhumb lines, great-circle arcs, or both. Generating the route comprises responsive to the points comprising the one or more soft points, avoiding the at least one obstruction by permitting a distance associated with the one or more soft points to be reached and adding at least one free waypoint. Generating the route comprises responsive to the points comprising the one or more hard points, avoiding the at least one obstruction by requiring the one or more hard points to be reached and adding the at least one free waypoint.

In addition to one or more of the features described above or below, or as an alternative, further embodiments could include wherein autonomously generating the route comprises selecting the route from candidate routes.

In addition to one or more of the features described above or below, or as an alternative, further embodiments could include wherein autonomously generating the route comprises selecting the route from candidate routes based on an optimization.

In addition to one or more of the features described above or below, or as an alternative, further embodiments could include wherein the optimization comprises iterating through the candidate routes based on costs for each of the candidate routes.

In addition to one or more of the features described above or below, or as an alternative, further embodiments could include wherein the route is optimized as a shortest path while accounting for whether the points comprise the one or more hard points, the one or more soft points, or both and avoiding the at least one obstruction.

In addition to one or more of the features described above or below, or as an alternative, further embodiments could include wherein use of the rhumb lines, the great-circle arcs, or both is selected in advance.

In addition to one or more of the features described above or below, or as an alternative, further embodiments could include optimizing turn types associated with the segments.

In addition to one or more of the features described above or below, or as an alternative, further embodiments could include selecting a turn type associated with the segments based on a shortest distance.

In addition to one or more of the features described above or below, or as an alternative, further embodiments could include autonomously controlling a vehicle on the route.

According to one or more embodiments, a method for optimizing turns in a route is provided. The method comprising receiving the route comprising points and segments associated with the points, accessing a turns library, and selecting turn types from the turns library in accordance with whether the points comprise one or more hard points, one or more soft points, or both. A hard point represents a first location through which the route is to pass. A soft point represents a second location associated with a region, defined by a corresponding radius or distance from the second location, through which the route is to pass. The hard point and soft point can be in any order (e.g., the hard point can come before or after the soft point, or there can be other intervening points in between the hard and soft points).

In addition to one or more of the features described above or below, or as an alternative, further embodiments could include wherein a subset of the turn types in the turns library are selectable for the one or more hard points.

In addition to one or more of the features described above or below, or as an alternative, further embodiments could include wherein any of the turn types are selectable for the one or more soft points.

In addition to one or more of the features described above or below, or as an alternative, further embodiments could include wherein the segments comprise rhumb lines, great-circle arcs, or both.

In addition to one or more of the features described above or below, or as an alternative, further embodiments could include wherein selecting the turn types from the turns library comprises selecting the turn types based on a shortest distance.

In addition to one or more of the features described above or below, or as an alternative, further embodiments could include autonomously controlling a vehicle on the route.

According to one or more embodiments, a system is provided. The system includes a processor and memory coupled to the processor and comprising computer-executable instructions that, when executed by the processor, cause the processor to perform operations. The operations include receiving points associated with a start location and a destination location, determining whether the points comprise one or more hard points, one or more soft points, or both, and determining at least one obstruction to avoid. A hard point represents a first location through which a route is to pass. A soft point represents a second location associated with a region, defined by a corresponding radius or distance from the second location, through which the route is to pass. Also, the operations include autonomously generating a route comprising the points and segments associated with the points, the segments comprising rhumb lines, great-circle arcs, or both. Generating the route comprises responsive to the points comprising the one or more soft points, avoiding the at least one obstruction by permitting a distance associated with the one or more soft points to be reached and adding at least one free waypoint. Generating the route comprises responsive to the points comprising the one or more hard points, avoiding the at least one obstruction by requiring the one or more hard points to be reached and adding the at least one free waypoint.

BRIEF DESCRIPTION OF THE DRAWINGS

The following descriptions should not be considered limiting in any way. With reference to the accompanying drawings, like elements are numbered alike:

FIG. 9 depicts an example reference path in accordance with one or more embodiments;

FIG. 14 depicts a flow chart of a method for autonomously optimizing turns in a global route among obstacles and control of an aircraft in accordance with one or more embodiments.

DETAILED DESCRIPTION

A detailed description of one or more embodiments of the disclosed apparatuses are presented herein by way of exemplification and not limitation with reference to the Figures. One or more embodiments provide an autonomous local motion planner (which may include one or more algorithms) that commands a flight control system of an aircraft to follow a desired global path while avoiding obstacles and terrain.

Figure 1:
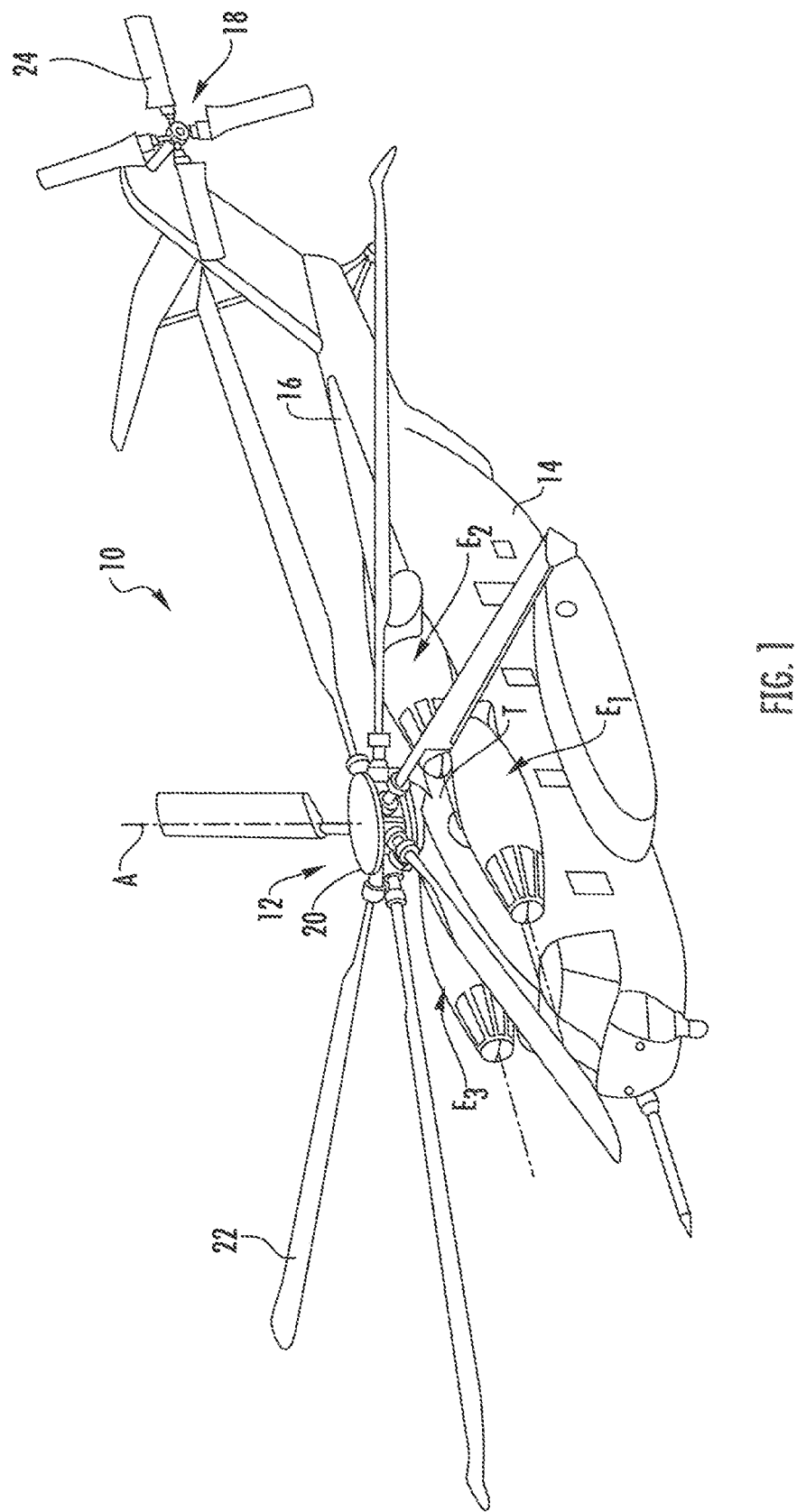
FIG. 1 depicts a rotary wing aircraft in accordance with one or more embodiments.

FIG. 1 schematically illustrates an exemplary vertical takeoff and landing (VTOL) rotary wing aircraft 10 having a main rotor assembly 12. The aircraft 10 includes an airframe 14 having an extending tail 16 which mounts a tail rotor system 18, such as an anti-torque system, a translational thrust system, a pusher propeller, a rotor propulsion system, and the like. The main rotor assembly 12 includes a plurality of rotor blade assemblies 22 mounted to a rotor hub 20. The main rotor assembly 12 is driven about an axis of rotation A through a main gearbox (illustrated schematically at T) by one or more engines E. Although a particular helicopter configuration is illustrated and described in the disclosed embodiment, other configurations and/or machines, such as high speed compound rotary wing aircraft with supplemental translational thrust systems, dual contra-rotating, coaxial rotor system aircraft, tilt-rotors and tilt-wing aircraft, and fixed wing aircraft, will also benefit from embodiments of the invention.

Figure 2:
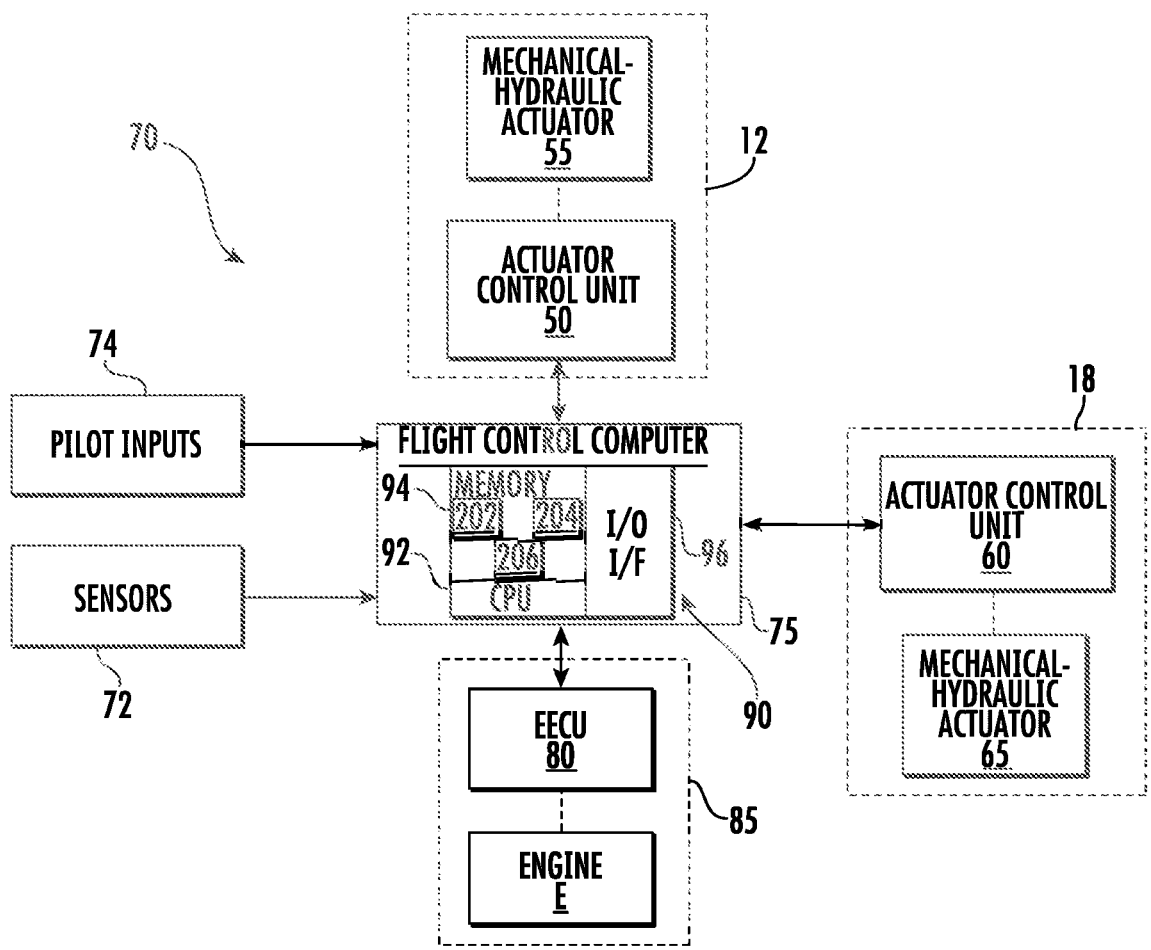
FIG. 2 depicts a schematic diagram of a flight control system in accordance with one or more embodiments.

Portions of the aircraft 10, such as the main rotor system 12 and the tail rotor system 18 for example, are driven by a flight control system 70 illustrated in FIG. 2. In one embodiment, the flight control system 70 is a fly-by-wire (FBW) control system. In a FBW control system, there is no direct mechanical coupling between a pilot's controls and movable components or control surfaces, such as rotor blade assemblies 20 or propeller blades 24 for example, of the aircraft 10 of FIG. 1. Instead of using mechanical linkages, a FBW control system includes a plurality of sensors 72 which can sense the position of controlled elements and generate electrical signals proportional to the sensed position. The sensors 72 may also be used directly and indirectly to provide a variety of aircraft state data to a flight control computer (FCC) 75. The FCC 75 may also receive pilot inputs 74 as control commands to control the lift, propulsive thrust, yaw, pitch, and roll forces and moments of the various control surfaces of the aircraft 10.

In response to inputs from the sensors 72 and pilot inputs 74, the FCC 75 transmits signals to various subsystems of the aircraft 10, such as the main rotor system 12 and the tail rotor system 18. The FCC 75 can use reference values in the pilot inputs 74 for feed forward control to quickly respond to changes in the reference values and can perform feedback control to reject disturbances detected via the sensors 72. Pilot inputs 74 can be in the form of stick commands and/or beeper commands to set and incrementally adjust reference values for controllers. The pilot inputs 74 need not be directly provided by a human pilot, but may be driven by an automatic pilot, a remote control, a navigation-based control, or one or more outer control loops configured to produce one or more values used to pilot the aircraft 10. The pilots inputs 74 can provide autonomous control of the aircraft 10 without human intervention and/or enable the aircraft 10 to be an optionally piloted vehicle.

The main rotor system 12 can include an actuator control unit 50 configured to receive commands from the FCC 75 to control one or more actuators 55, such as a mechanical-hydraulic actuator, for the rotor blade assemblies 20 of FIGS. 1 and 2. In an embodiment, pilot inputs 74 including cyclic and/or collective commands may result in the actuator control unit 50 driving the one or more actuators 55 to adjust a swashplate assembly to control the rotor blade assemblies 20 of FIG. 1. Alternatively, the FCC 75 can directly control the one or more actuators 55, and the actuator control unit 50 can be omitted.

The tail rotor system 18 can include an actuator control unit 60 configured to receive commands from the FCC 75 to control one or more actuators 65, such as a mechanical-hydraulic actuator, associated with one or more propeller blades 24. In an embodiment, pilot inputs 74 include a propeller pitch command for the actuator control unit 60 to drive the one or more actuators 65 for controlling the propeller blades FIG. 1. Alternatively, the FCC 75 can directly control the one or more actuators 65, and the actuator control unit 60 can be omitted.

The FCC 75 can also interface with an engine control system 85 including one or more electronic engine control units (EECUs) 80 to control the engines E. Each EECU 80 may be a digital electronic control unit such as Full Authority Digital Engine Control (FADEC) electronically interconnected to a corresponding engine E. Each engine E may include one or more instances of the EECU 80 to control engine output and performance. Engines E may be commanded in response to the pilot inputs 74, such as a throttle command.

Rather than simply passing pilot inputs 74 through to various control units 50, 60, and 80, the FCC 75 includes a processing system 90 that applies models and control laws to augment commands. The processing system 90 includes processing circuitry 92, memory 94, and an input/output (I/O) interface 96. The processing circuitry 92 can be any type or combination of computer processors, such as a microprocessor, microcontroller, digital signal processor, application specific integrated circuit, programmable logic device, and/or field programmable gate array, and is generally referred to as central processing unit (CPU) 92. The memory 94 can include volatile and non-volatile memory, such as random access memory (RAM), read only memory (ROM), or other electronic, optical, magnetic, or any other computer readable storage medium onto which data and control logic as described herein are stored. Therefore, the memory 94 is a tangible storage medium where instructions executable by the processing circuitry 92 are embodied in a non-transitory form. The I/O interface 96 can include a variety of input interfaces, output interfaces, communication interfaces and support circuitry to acquire data from the sensors 72, pilot inputs 74, and other sources (not depicted) and may communicate with the control units 50, 60, 80, and other subsystems (not depicted).

Figure 3:
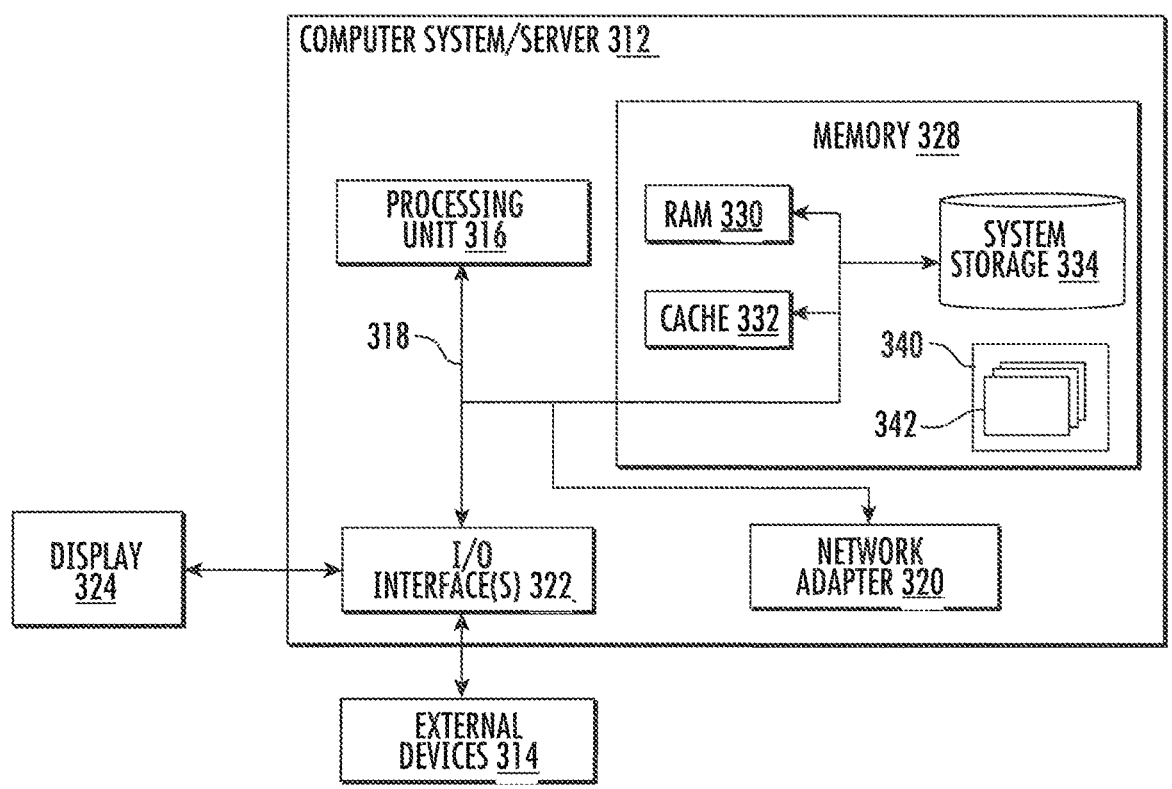
FIG. 3 depicts a schematic diagram of an example computing system having functions and features utilized in accordance with one or more embodiments.

The FCC 75 also includes an autonomous global planner module 202 also referred to as global planner, an autonomous flight turns module 204, and library of flight turns 206 also referred to as a library of turns. The global planner module 202, flight turns module 204, and the turns library may be in and/or coupled to memory 94 to function as discussed herein. FIG. 3 depicts a schematic of an example computing system 312 having functions and features utilized according to one or more embodiments and will be discussed in greater detail later in the description.

The autonomous global planner module 202 and flight turns module 204 can be implemented as instructions stored on a computer-readable storage medium, as hardware modules, as special-purpose hardware (e.g., application specific hardware, Application Specific Integrated Circuits (ASICs), as embedded controllers, hardwired circuitry, etc.), or as some combination or combinations of these. In examples, the module described herein can be a combination of hardware and programming. The programming can be processor executable instructions stored on a tangible memory, and the hardware can include processing circuitry 92 for executing those instructions. Thus a system memory can store program instructions that when executed by processing circuitry 92 implement the module described herein. Alternatively or additionally, the FCC 75 can include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

The global planner module 202 is configured to autonomously command the FCC 75 of the aircraft 10 to generate and/or follow a desired global path or global route while avoiding obstacles, terrain, etc., which can be generally referred to as obstructions. The flight turns module 204 determines the type of turns used to connect segments of the global route. The global route is a three-dimensional (3D) route, for example, having directions in an x, y, z coordinate system. The global planner module 202 is responsible for computing safe and dynamically feasible motion plans from a current vehicle state to a goal location. This is accomplished by providing constraints on known, unsafe airspace, such as obstructions, and constraints on feasible motion from a given vehicle model.

Particularly, the global planner module 202 is responsible for generating a global plan or global route to carry out a desired mission among no-fly zones (NFZs) and terrain. The global plan or route contains a sequence of waypoints, each of which specifies a geographic coordinate in three-dimensional airspace and a desired speed at which to approach. Global planning for aerial vehicles often involves large distances such as, for example, 100 to 1000 (or more) nautical miles. At these distances, flat earth assumptions are not valid. Therefore, the global planning algorithms of global planner module 202 have to support the non-flatness of the earth (i.e., a sphere). In addition, one factor that distinguishes global planning for aircraft or airplanes compared to cars or robot arms is that pilots prefer to fly a "simple" global path. This simplicity measure is subjective, but the global planner module 202 takes this to mean that the global planner module 202 should minimize the number of segments that will be connected to form the entire global plan.

According to one or more embodiments, the global planner module 202 is configured to address and/or avoid one or more issues associated with search-based and sample-based motion planning techniques. In sample-based or search-based planners, paths tend to be complicated with many short segments connected together, and attempting to simplify the path with shortcutting or other methods requires extra processing. The sample-based or search-based planners require a large and complex code base such as, k-dimensional tree (kd-tree), dynamic memory allocation, priority heap, etc. However, in accordance with one or more embodiments, the global planner module 202 utilizes an approach which is simpler and easier for software certification that is needed for flight vehicles. Further, unlike the global planner module 202, it is difficult to adapt sample-based or search-based planners to plan over long distances (e.g., 100 to 1000 (or more) nautical miles) considering a non-flat earth using latitude/longitude coordinates. The incremental construction of paths in these algorithms for sample-based or search-based planners does not intuitively extend to latitude/longitude coordinate system.

In accordance with one or more embodiments, the global planner module 202 configured with various functions. The global planner module 202 is configured such that the planning domain is specified in latitude and longitude coordinates (i.e., latitude/longitude). Latitude/longitude coordinates are the standard coordinate system that is used in aeronautics. The global planner module 202 is configured to specify routes over large distances with minimal parameterization and with primitives such as great-circle arcs and/or rhumb lines. The global planner module 202 is configured with the ability to specify the number of waypoints to further minimize parameterization of domain space and the produced global route. The global planner module 202 is configured with the ability to enforce takeoff and/or landing direction as well as takeoff and/or landing glide slope. Additionally, the global planner module 202 is configured with the ability to naturally enforce visitation of specific locations using hard via-points without the aid of heuristics and to handle moving no-fly zones within the optimization. As used herein, a hard via-point (also referred to herein as a hard point) represents a location to which, and/or through which, the aircraft (or vehicle) has to navigate or fly. In other words, a hard point represents a location through which a route of the aircraft or vehicle is to pass. For example, a hard point can refer to a location at which a delivery is to be made by the aircraft or vehicle, or a refueling site. The user/pilot can utilize one or more external devices 314 to input start location, destination location, waypoints (including hard via-points and soft via-points), takeoff and/or landing direction, takeoff and/or landing glide slope, etc., to global planner module 202. The global planner module 202 can receive, retrieve (e.g., from memory such as memory 94), and/or be uploaded with known obstructions such as terrain, no-fly zones, etc.

Further details regarding the global planner module 202 and flight turns module 204 are provided below, which can be executed and performed by FCC 75 of the flight control system 70. In one or more embodiments, the flight turns module 204 can be included in global planner module 202, and/or features of the flight turns module 204 can be integrated in the global planner module 202. Additionally, the global planner module 202 can include, call, and/or cause various algorithms to be executed according to one or more embodiments. The global route output by global planner module 202 can be utilized by FCC 75 of the flight control system 70 to command aircraft 10 and/or utilized by a local planner module (not shown) of FCC 75. The local planner module is designed to follow the global route using real time sensor data which allows the local planner module to react immediately to any previously unknown obstructions. Although specific examples and implementations are discussed below, these are provided for explanation purposes and not limitation. Additionally, sections/headings are utilized for ease of understanding and not limitation, and particularly Sections 1-8 are discussed below.

1. Example Global Routes Or Paths

Various waypoints in the mission and global route/plan are defined using the global planner module 202. Each waypoint specifies a geographic coordinate in three-dimensional airspace and a desired speed (either ground or air) at which to fly the aircraft 10. In accordance with embodiments, various types of waypoints are discussed below.

Via-points are visitations points which the operator (which could be a pilot) can specify, and the operator can input the via-points (as waypoints) to global planner module 202 of FCC 75. Accordingly, the visitation points are defined as via-points. Each via-point has a radius associated with it.

If the radius of a via-point is zero, then via-point is defined as a hard via-point. The operator can identify a via-point as a hard via-point. A hard via-point represents a location such that the global planner module 202 must fly or navigate aircraft 10 exactly to this location and/or through this location. A hard via-point can be a constraint for the global planner module 202. On the other hand, there are soft via-points. A soft via-point (also referred to herein as a soft point) is a via-point or location that has, or is associated with, a radius greater than zero that defines a region around the location. The global planner module 202 is allowed, or has to, to fly or navigate the aircraft 10 through the region defined around the location, e.g., near the soft via-point and within the specified radius. In other words, a soft point represents a location associated with a corresponding region, e.g., defined by a corresponding non-zero radius or distance from the location, and a route of the aircraft or vehicle has to pass through the region associated with the soft point. In one or more embodiments, the global planner module 202 presents the operator an option to specify the radius for a soft via-point. In one or more embodiments, the global planner module 202 is configured to utilize a predefined radius that is preset in advance. Also, the global planner module 202 can have a selection of radii that can be selected by the operator and/or selected by the global planner module 202.

Figure 7:
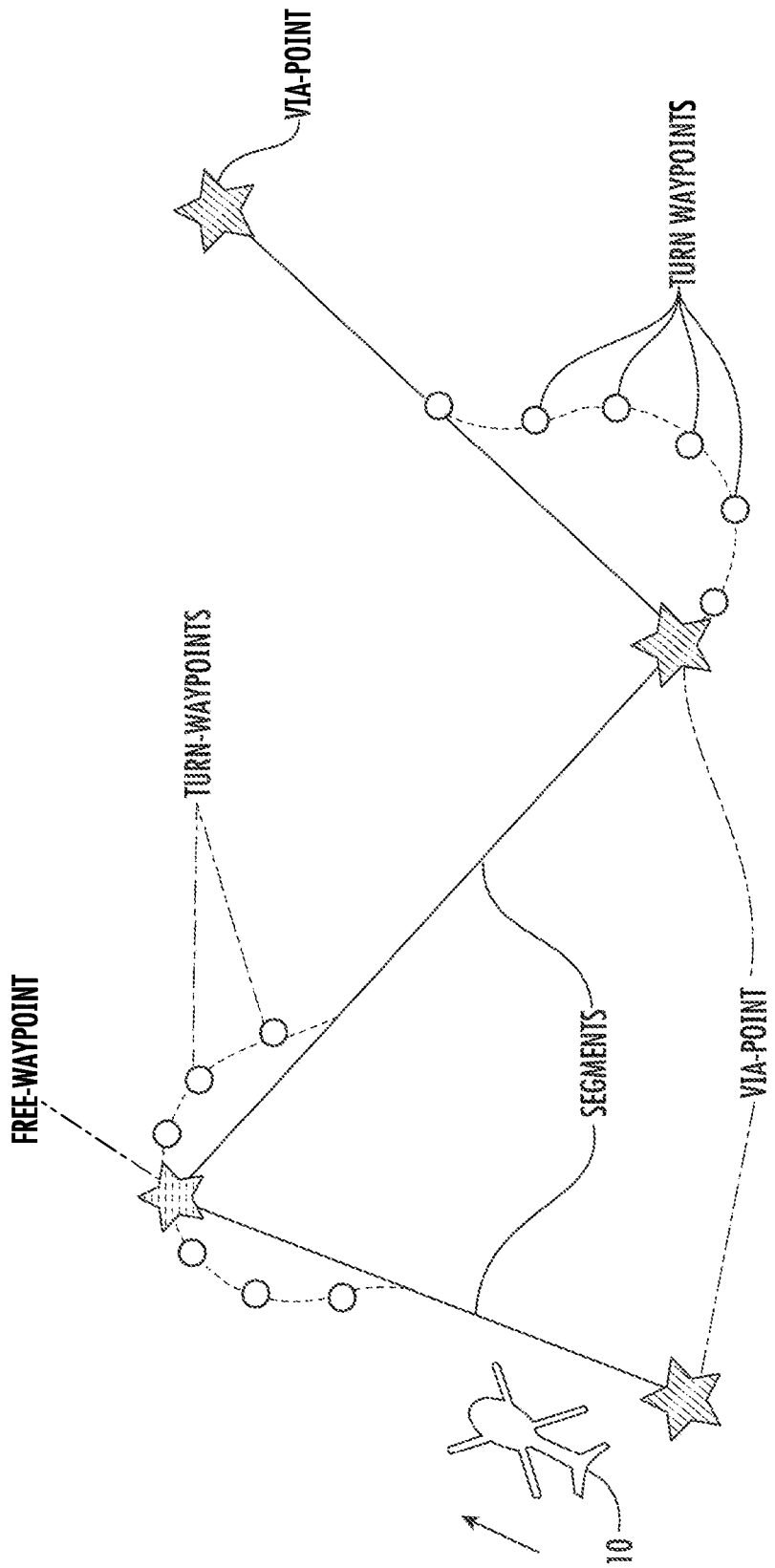
FIG. 7 depicts an example global route with turn way-points to enforce desired turn types in accordance with one or more embodiments.

Free waypoints are defined as the waypoints that are produced by the global planning algorithm of the global planner module 202 to enable obstacle avoidance. Free waypoints are not specified by the operator, i.e., not via-points. Turn waypoint are utilized to enforce a desired turn type for flying between two segments. The global planner module 202 can include turn waypoints in a global route as shown in FIG. 7 below. In the absence of turn waypoints, the aircraft's waypoint following flight control system could perform a turn type that might not be desired by the operator.

Figure 4:
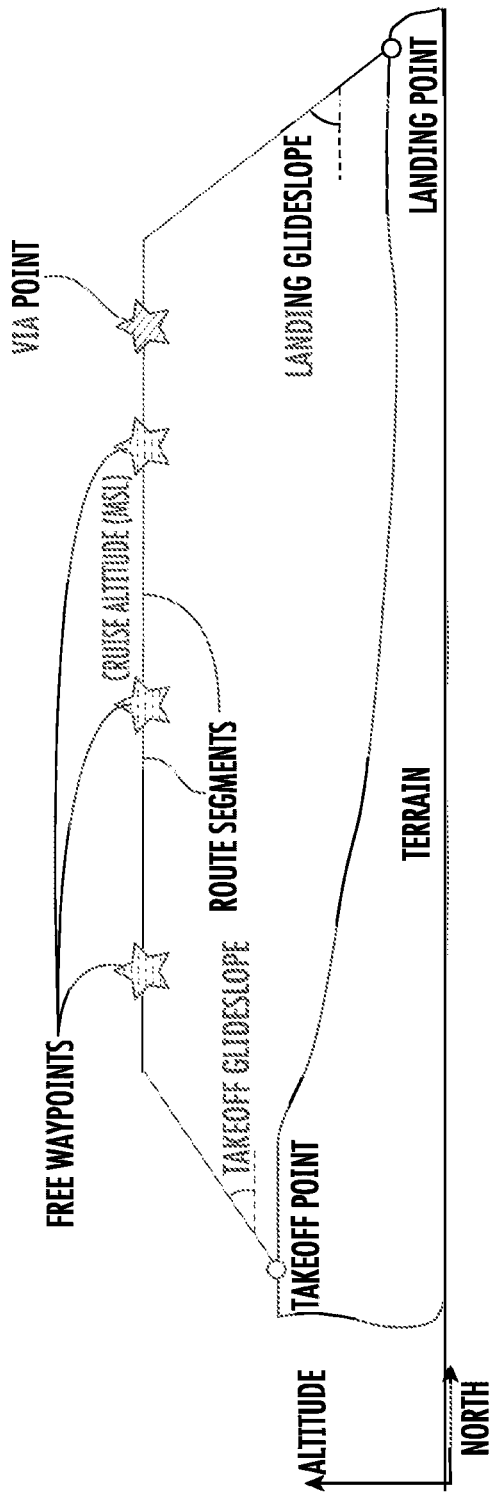
FIG. 4 depicts an example global route in accordance with one or more embodiments.
Figure 5:
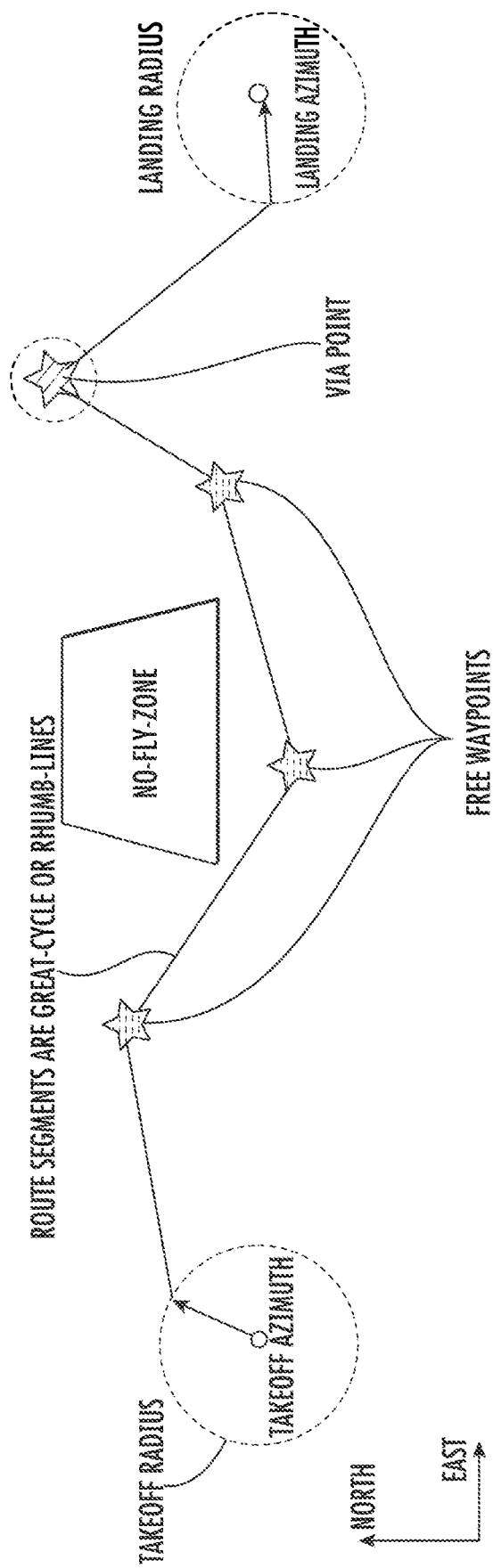
FIG. 5 depicts a top view of the global route illustrated in FIG. 4 in accordance with one or more embodiments.

FIG. 4 depicts an example global route according to one or more embodiments. FIG. 5 depicts a top view of the global route in FIG. 4. As one illustrated example, the mission is to fly from a takeoff point with a given latitude, longitude, altitude, azimuth, and glide slope, fly at the given cruise altitude, and land at the landing point with a given latitude, longitude, altitude, azimuth, and glide slope. There can be a user-defined radius (as best seen in FIG. 5) in which the takeoff azimuth and landing azimuth are enforced. During the mission, static no-fly zones (NFZs), moving NFZs (MNFZs), and terrain should be avoided. FIGS. 4 and 5 illustrate a single via-point as a mandatory visitation point received by the global planner module 202, and this via point could be a soft via-point or hard via-point. The global planner module 202 is configured to insert free waypoints to avoid obstacles such as the no-fly zone and even the terrain.

Figure 6:
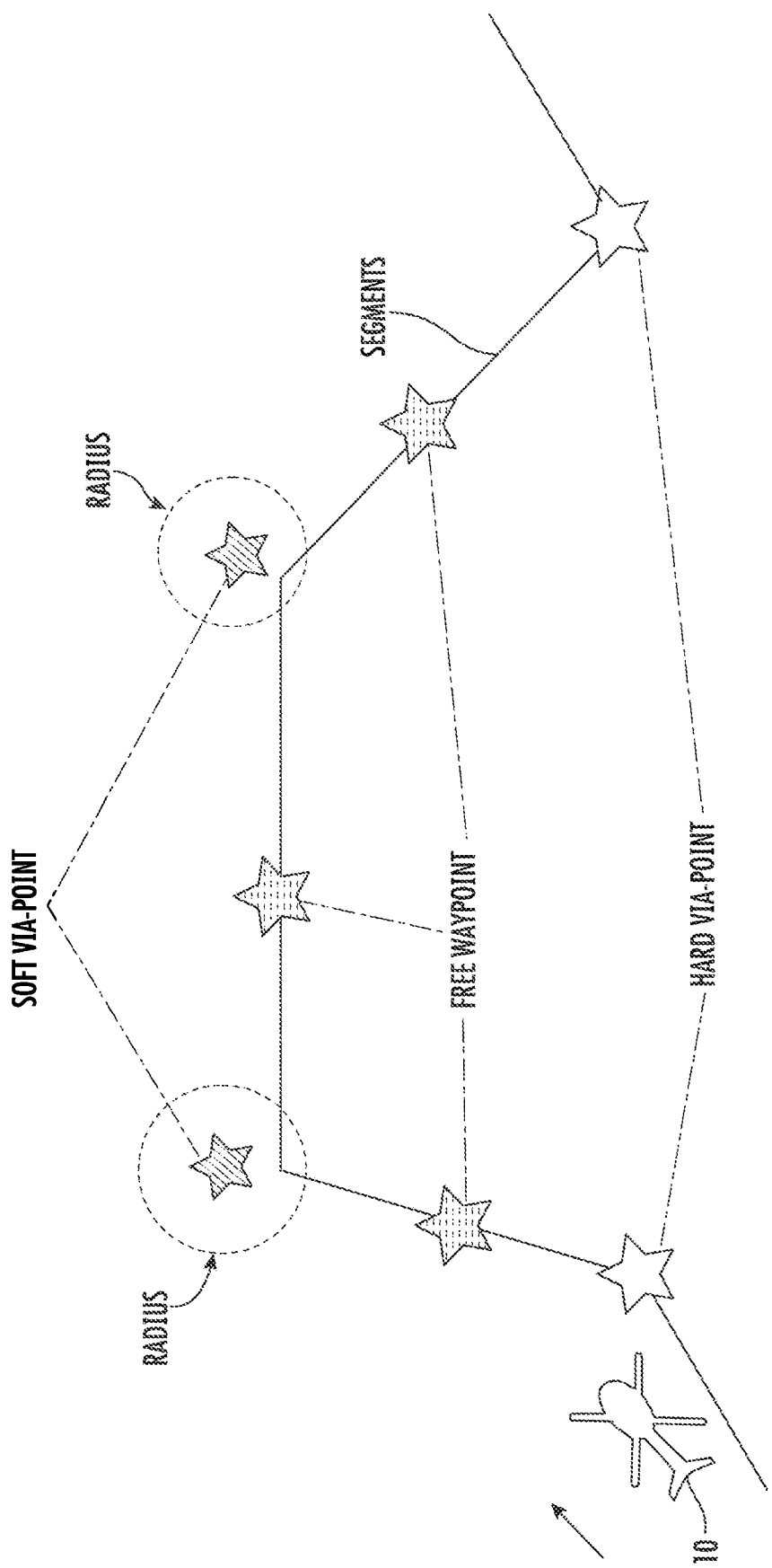
FIG. 6 depicts an example global route of a mission comprised of hard and soft via-points in accordance with one or more embodiments.

FIG. 6 depicts a global route generated by global planner module 202. The global route of the mission is comprised of hard and soft via-points according to one or more embodiments. Free waypoints locations are controlled by the global planner module 202 and are used mainly to avoid collisions and/or obstacles. The soft and hard via-points can be input to the global planner module 202, and the global planner module 202 can generate a route that requires aircraft 10 to fly to each hard via-point. However, the global route is generated to have aircraft 10 to fly or navigate near the soft via-points, for example, within the radius of the soft via-points. The global planner module 202 can generate the global route to pass exactly through each hard point, and pass through each region associated with, or defined by a radius or distance from a corresponding soft point. Each soft point can be associated with its own radius and corresponding region. The radius can be non-zero or greater than zero. In FIG. 6, each hard point is illustrated with a hashed star with no circle around it, while each soft point is illustrated with hashed star having a circle around it to represent the corresponding region. An example of a hard point may be a landing or delivery location at which the aircraft (or vehicle) has to land or stop, for example, to make a delivery. An example of a soft point may be an antenna or transmitter that the aircraft (or vehicle) needs to communicate with at some point while on the route. As such, the aircraft (or vehicle) has to fly or navigate in the proximity (e.g., within a communication range) of the transmitter or antenna. As used herein, a hard point may imply a hard constraint and a soft point may imply a soft constraint with respect to point locations of the route to be generated.

In addition to via-points which can be hard or soft via-points and the free waypoints, FIG. 7 depicts turn waypoints included in the global plan to enforce desired turn types. As noted herein, the global planner module 202 can include the flight turns module 204 and/or be coupled to flight turns module 204. Accordingly, the global planner module 202 can determine the type of turn required by the aircraft to follow the global route. The global planner module 202 (and/or flight turns module 204) can determine that one type of turn can be utilized between two segments, and another type of turn can be utilized between other segments, based on whether the via-points are soft via-points versus hard via-points. To capture the non-flatness of the earth, the segments that constitute the global routes discussed herein are (or can be) great-circle arcs and/or rhumb lines as will be described in Section 2.

2. Obstructions: Static No-Fly Zones, Moving No-Fly Zones, and Terrain

The global planner module 202 is configured to check the collision of route segments in the global route against static no-fly zones (NFZ), moving NFZs (MNFZs), and terrain. MNFZs are intended to capture bad atmospheric conditions such as turbulence, tornados, storms, etc. As one example, the static NFZs may be modeled as 2.5 dimensional (D) polygonal prisms (which can be convex or concave) with a maximum altitude, although other types of models can be utilized. Cylindrical NFZs may be approximated with 2.5D polygons using the same algorithm for collision checking as polygonal NFZs. The moving NFZs can be modeled as 2D polygons (which can be convex or concave) with a speed and heading ($V_{MNFZ}$, $\Psi_{MNFZ}$).

Terrain collision checking can be performed point-wise; this means that the route segments are discretized into points and checked against the terrain for collision. NFZ collision checking can be performed segment-wise. Performing NFZ collision checking segment-wise means that the entire segment of the route is checked against the NFZs without discretizing the segment. If the route has long segments, segment-wise checking is more efficient because a check is performed only once for a segment. In addition, segment-wise collision checking against polygonal prism NFZs can be done analytically.

3. Route Primitives

Planning in the latitude-longitude coordinate system lends itself to planning over long distances across earth. Every location on the surface of earth can be represented in $\mathbb{R}^2$. Nevertheless, trajectories are to be provided that will connect the waypoints. According to one or more embodiments, the global planner module 202 can provide the operator two options, rhumb lines and great-circle arcs, as the route segment. Using a graphical interface presented to the operator/user by the global planner module 202, one of the two options for route segments is to be chosen prior to planning.

A rhumb line is defined as an arc crossing all meridians of longitude at the same angle. These paths are useful in navigation because they can be followed by maintaining constant bearing measured relative to true or magnetic north. While rhumb lines appear straight on a map using the Mercator projection, rhumb lines actually require constant steering to maintain. The rhumb line forms a spiral towards the north pole of navigation when planning over short distances, for example, less than and/or about equal to ($\lesssim$) 500 nautical miles. However, rhumb lines may appear to be a poor choice over large distances where their sub-optimal total length can result in significant increases in flight time and fuel usage.

Regarding great-circle arcs, these trajectories represent the minimum distance path along the surface of the earth between any two locations. Great-circle arcs appear curved on a Mercator projection, but in fact they do not require any steering to follow. While appearing curved, when viewed on a globe the great circle arc resembles a straight line across the surface of the sphere. Great-circle arcs can be utilized for (all) long-distance global plans, and great circle arcs will not require any steering but will result in constantly changing bearing relative to true and magnetic north.

Figure 8A:
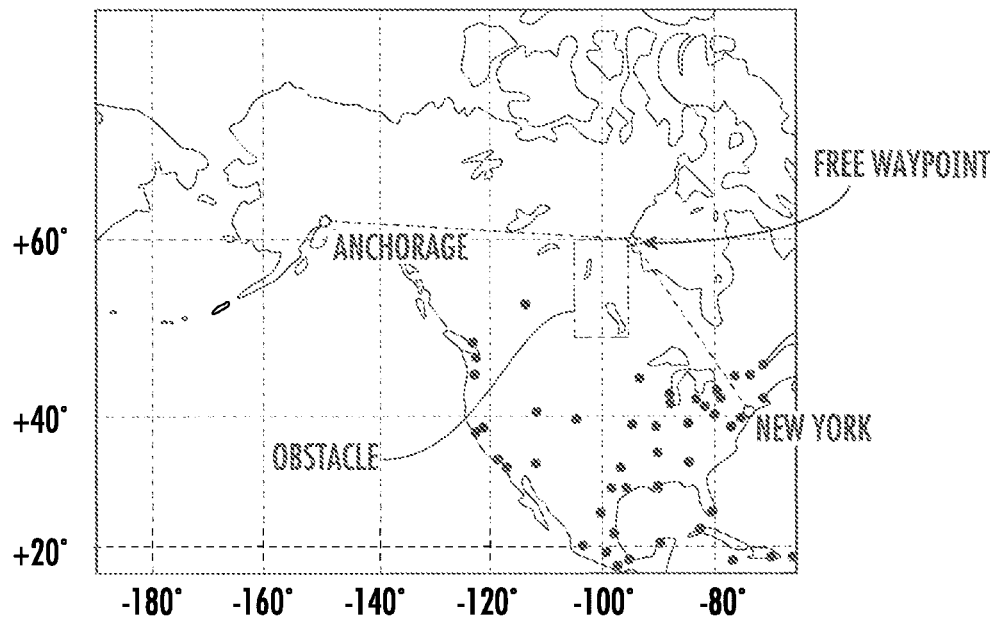
FIG. 8A depicts trajectory from a start location to a destination location using a rhumb line global plan in accordance with one or more embodiments.
Figure 8B:
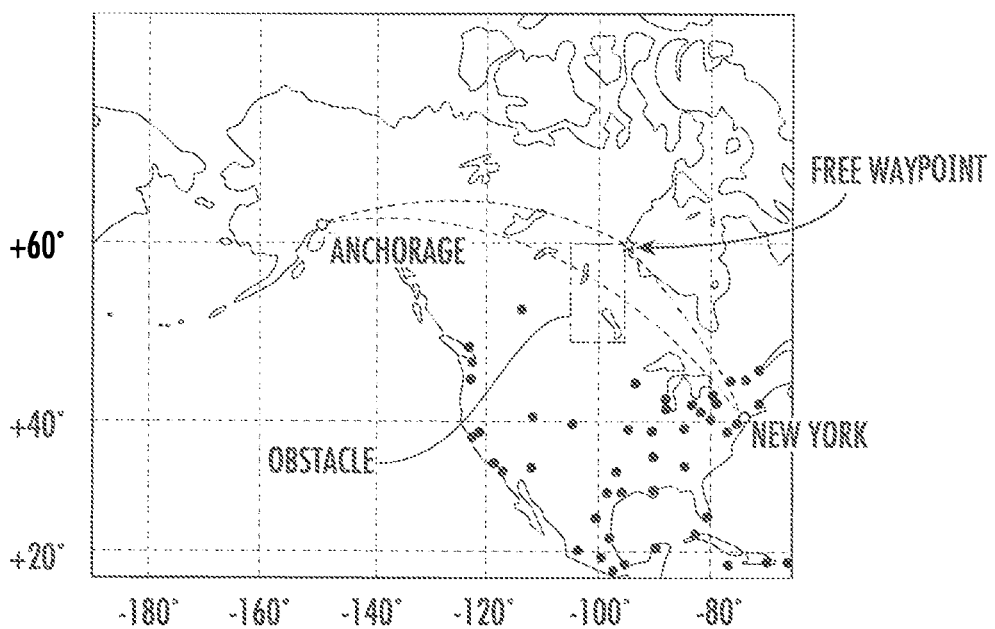
FIG. 8B depicts trajectory from a start location to a destination location using a great circle global plan in accordance with one or more embodiments.

FIGS. 8A and 8B depict trajectories between New York and Anchorage that avoid a large highlighted obstacle. FIG. 8A illustrates a rhumb line global plan. FIG. 8B illustrates a great circle global plan. In FIGS. 8A and 8B, the single free waypoint is represented by a star. The rhumb line trajectory is straight on the Mercator projection, but is longer than the greatcircle arc option.

4. Example Problem Formulation

4.1 Waypoint Specification

Using global planner module 202, all paths (i.e., global routes) specified will be done so in terms of waypoints. A waypoint $\vec{w}$ is described as follows $$\vec{w} = [\nu, \mu, \lambda, h, v, \tau, d] \tag{1}$$

The variable $\nu$ indicates the mission index of each waypoint and will be used to maintain order between waypoints within the same construct. The variables $\mu$, $\lambda$ are the geographic coordinates latitude and longitude respectively. The variables h, v describe the altitude and tracked speed of the waypoint respectively. The waypoint type is represented by $\tau \in \{hard, soft\}$. When the waypoint type given is soft, the distance at which this point can deviate from original location in the planned route is quantified by d. However, when the waypoint type given is hard, there is no distance for deviation and/or the distance d can be equal to zero (0).

4.2 Waypoint Constructs and Notation

Waypoints can be part of other structures that can contain multiple variants of them, such as the example matrix E below.

$$E = \begin{bmatrix} \vec{w}_1^E \\ \vec{w}_2^E \\ \vdots \\ \vec{w}_e^E \end{bmatrix} = \begin{bmatrix} [\nu_1^E, \mu_1^E, \lambda_1^E, h_1^E, v_1^E, \tau_1^E, d_1^E] \\ [\nu_2^E, \mu_2^E, \lambda_2^E, h_2^E, v_2^E, \tau_2^E, d_2^E] \\ \vdots \\ [\nu_e^E, \mu_e^E, \lambda_e^E, h_e^E, v_e^E, e_e^E, d_e^E] \end{bmatrix} \tag{2}$$

Each capital bold letter represents a matrix of waypoints and the number of rows for this matrix will be a lower case version of the same letter. Here E is a waypoint matrix with e rows or waypoints. At times, it will be necessary to refer to specific variables inside of the matrix explicitly. Any variable that has an upper case bold superscript belongs to the matrix with matching symbol (unless otherwise noted). Likewise, the subscript of such a variable marks its row along the matrix. For example, the waypoint $\vec{W}_1^E$ belongs to the first row of matrix E because its superscript is E and its subscript is 1. One exception to this rule is for variables that are associated with specific rows of the waypoint matrix, but are not contained within the waypoint matrix. For example, variable $\theta_2^E$ can represent the angular polar coordinate for a waypoint in matrix E at row 2.

4.3 Mission Specification

A mission may be defined as a list of waypoints of varying type, from which the global planner module 202 is expected to generate a plan that connects them. The list of waypoints can be described as a mission matrix M below.

$$M = \begin{bmatrix} \vec{w}_1^M \\ \vec{w}_2^M \\ \vdots \\ \vec{w}_m^M \end{bmatrix} \quad (3)$$

For the mission, it is assumed that mission index of each waypoint is the row number ($v_i^M = i$). The mission matrix M can be further subdivided into two lists, one for a hard via-points and the other for b soft via-points. As recalled from above, A and B are the matrices and a and b are the number of rows for those matrices. By coincidence, the number of rows is also the number of waypoints a and b.

$$A = \begin{bmatrix} \vec{w}_1^A \\ \vec{w}_2^A \\ \vdots \\ \vec{w}_a^A \end{bmatrix} \quad (4)$$

$$B = \begin{bmatrix} \vec{w}_1^B \\ \vec{w}_2^B \\ \vdots \\ \vec{w}_b^B \end{bmatrix} \quad (5)$$

Where A and B are the lists containing information exclusive to either hard or soft via-points respectively.

$$\vec{w}_i^A = \vec{w}_j^M | \forall i \in \{1 \ldots a\}, \exists j \in \{1 \ldots m\}, \tau_i^A = \text{hard} \quad (6)$$

$$\vec{w}_i^B = \vec{w}_j^M | \forall i \in \{1 \ldots b\}, \exists j \in \{1 \ldots m\}, \tau_i^B = \text{soft} \quad (7)$$

In maintaining the mission index $v$, an element at row i in either list is a copy of the via-point at row $v_i$ in M. It is assumed that both lists maintain the same relative ordering as the mission such that $v_i^A > v_{i-1}^A$ and $v_i^B > v_{i-1}^B$. This also enforces uniqueness.

4.4 Free Waypoint Specification

Separate from the two matrices (e.g., matrices A and B) that specify mission waypoints is the matrix c of free moving waypoints (i.e., free waypoints)

$$C = \begin{bmatrix} \vec{w}_1^C \\ \vec{w}_2^C \\ \vdots \\ \vec{w}_c^C \end{bmatrix} \quad (8)$$

where $v_i^C$ will denote the mission waypoint index that each free waypoint is assigned to. Since the inventors expect the generated path to begin and end at the first and last mission waypoints, it is assumed that no free waypoint is assigned to the last waypoint index ($v_c^C < m$). Regardless of how mission indices are specified for free waypoints, the mission indices for free waypoints are done so in order with the obvious difference being that two subsequent free waypoints can be assigned to the same index ($v_i^C \geq v_{i-1}^C$). It is noted that an example illustration of waypoint mapping between constructs is provided in FIG. 10 and will be discussed further below.

4.5 State Specification

The state will contain (only) the points that can be moved by the global planner module 202 during the optimization process in the appropriate parameterization. Thus far, there are only two: free waypoints and soft via-points. In the state space, a free waypoint is described by its geographic (latitude/longitude) coordinates $\mu^C$, $\lambda^C$. To capture the distance constraints of soft via-points from their original locations through the domain, polar coordinates $\delta^B$, $\theta^B$ are used instead.

A state vector representing c free waypoints and b soft via-points are specified as below.

$$\vec{x} = \begin{bmatrix} \mu_1^C \\ \lambda_1^C \\ \mu_2^C \\ \lambda_2^C \\ \vdots \\ \mu_c^C \\ \lambda_c^C \\ \delta_1^B \\ \theta_1^B \\ \delta_2^B \\ \theta_2^B \\ \vdots \\ \delta_b^B \\ \theta_b^B \end{bmatrix} \quad (9)$$

where $\delta_i$, $\theta_i = \text{polar}(\mu_i, \lambda_i, \mu_{o_i}, \lambda_{o_i})$. The inventors define the function $\text{polar}(\mu, \lambda, \mu_o, \lambda_o): \mathbb{R}^4 \to \mathbb{R}^2$ where $\text{polar}(\mu, \lambda, \mu_o, \lambda_o)$ retrieves the polar coordinates of $\mu$, $\lambda$ with respect to a point with coordinates $\mu_o$, $\lambda_o$ or the original location. The existence of an additional soft via-point matrix BO that retains the original coordinates of B is assumed.

Similarly, two vectors that specify the domain of the state vector can be described as follows.

$$\vec{x}_{lb} = \begin{bmatrix} \mu_{min} \\ \lambda_{min} \\ \vdots \\ \times c \\ 0 \\ 0 \\ \times b \end{bmatrix} \quad (10)$$

$$\vec{x}_{ub} = \begin{bmatrix} \mu_{max} \\ \lambda_{max} \\ \vdots \\ \times c \\ d_1^B \\ 2\pi \\ d_2^B \\ 2\pi \\ \vdots \\ d_b^B \\ 2\pi \end{bmatrix} \quad (11)$$

In the above, $\vec{x}_{lb}$ and $\vec{x}_{ub}$ specify the lower and upper bounds of the domain constraints imposed on $\vec{x}$ respectively. The variable $d_i^B$ is the d value (or distance limit) of $\vec{w}_i$ in B and $\mu_{min}$, $\mu_{max}$, $\lambda_{min}$, $\lambda_{max}$ define the spatial boundaries for free waypoints.

4.6 Reference Path Specification

Using the global planner module 202, a reference path (as depicted in FIG. 9) can be thought of as a sequence of arbitrary waypoints that are not required to adhere to any non-holonomic constraints typical for helicopters at forward flight. Such a path can be constructed by merging the three sequences of points in A, B, C in order of $v_i$ to form a matrix with rows r=a+b+c.

$$R = f_R(\vec{x}) = \begin{bmatrix} \vec{w}_1^R \\ \vec{w}_2^R \\ \vdots \\ \vec{w}_r^R \end{bmatrix} \quad (12)$$

where $f_R(x)$ is a function that retrieves the reference path matrix R from a given state vector $\vec{x}$. Internally, $f_R(\vec{x})$ updates the values of B and C from r before merging. Each waypoint in R maps to a waypoint in one of the other matrices. In other words, $$w_i^R = w_j^k | \forall i \in \{1 \ldots \text{rows}(R)\}, \exists k \in \{A,B,C\}, \exists j \in \{1, \ldots, \text{rows}(k)\} \quad (13)$$

A proper construction of R ensures that all points are laid out in order and that no duplicates are provided.

$$v_i^R > v_{i-1}^R | \forall i \in \{2, \ldots, \text{rows}(R)\}, \tau_i^R \neq \text{free} \quad (14)$$

$$v_i^R = v_{i-1}^R | \forall i \in \{2, \ldots, \text{rows}(R)\}, \tau_i^R = \text{free} \quad (15)$$

$$\vec{w}_i^R \neq \vec{w}_j^R | \forall i \in \{1 \ldots \text{rows}(R)\}, \forall j \in \{1 \ldots \text{rows}(R)\}, i \neq j \quad (16)$$

FIG. 9 depicts an example of such a reference path with three via-points and four free waypoints. Particularly, the reference path has three via-points and two free waypoints between each pair of via-points in this example. The reference path is a collection of route segments, and there is motion path discussed in Section 4.8 below. The motion path adds all the turns to the reference path so that a flyable global route is generated. The global route denotes the final product of the global route planner module 202.

4.7 Segment Specification

A segment is defined as a continuous path between two waypoints. The types of segments which are assume relevant for planning around the globe are rhumb lines $S_{rh}(\vec{w}_i, \vec{w}_j)$ and great-circle arcs $S_{gc}(\vec{w}_i, \vec{w}_j)$. For the remainder of the document, either can be referred to by $S(\vec{w}_i, \vec{w}_j)$. A waypoint along a given segment is defined as $\vec{w}_{i,j,\alpha} = S(\vec{w}_i, \vec{w}_j, \alpha)$, where $\alpha \in [0,1]$ indicates the progress along the segment. Likewise, the original waypoint pair can be retrieved via extreme values of $\alpha$ ($\vec{w}_i = S(\vec{w}_i, \vec{w}_j, 0) \wedge \vec{w}_j = S(\vec{w}_i, \vec{w}_j, 1)$).

4.8 Motion Path Specification

Tracking of the reference path may not be ideal for a vehicle with non-holonomic constraints. In the case of a helicopter, such non-holonomic constraints are due to the dynamic limitations of the target vehicle (such as limited climb rate and bank angle). Any global path generated by the global motion planner module 202 is expected to adhere to these constraints. To ensure such constraints are followed, the global planner module 202 generates another ordered set of waypoints from the first called a motion path.

$$O = f_o(\vec{x}) = \begin{bmatrix} \vec{w}_1^O \\ \vec{w}_2^O \\ \vdots \\ \vec{w}_o^O \end{bmatrix} \quad (17)$$

In the above, O is another waypoint matrix (i.e., motion path matrix) with rows o, and $\eta_o(\vec{x})$ is a function that generates on ordered set of waypoints which adhere to an approximation of the dynamic limitations of the target platform while following the sequence of waypoints inside of R in order. While there are multiple ways this could be implemented, Motion Path Generation in Section 7 provides one example for explanation purposes.

Returning to FIG. 10, depicted is an illustration of valid mapping between waypoints from various constructs starting from an example mission M to a reference path R. Cell values indicate the mission waypoint index v assigned. Colors are used to indicate mappings where red is for hard via-points, green is for soft via-points, and blue is for free waypoints. The example mission is comprised of three hard via-points which are identified by indices of 1, 3, 4, and 7 and three soft via-points which are identified by indices 2, 5, and 6. These are mapped to A and B respectively and in order. There are four free waypoints each of which is assigned a mission index value v corresponding to an entry in M. When mapped to R all entries are inserted in order by their mission indices v.

Figure 10:
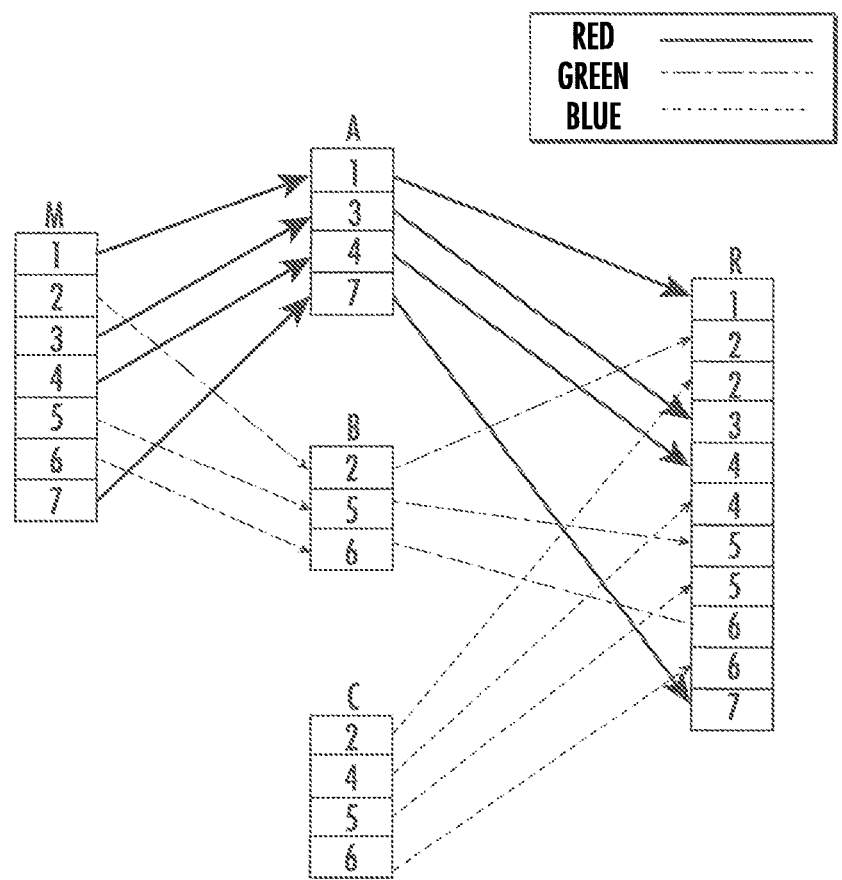
FIG. 10 depicts an illustration of valid mapping between waypoints from various constructs starting from an example mission to a reference path in accordance with one or more embodiments.

The mapping shown in FIG. 10 illustrates how global planner module 202 maps the mission matrix M to hard via-points matrix A and soft via-point matrix B. Further, global planner module 202 maps waypoints in hard via-points matrix A and soft via-point matrix B and waypoints in free moving waypoints matrix C to a generated reference path matrix R. The free waypoints do not map back to the mission M because the free waypoints are additionally inserted as determined by global planner module 202. By design reference path matrix R does not account for the dynamics or flight capabilities of the aircraft 10. In order to ensure the dynamics or flight capabilities of the aircraft 10 are accounted for or adhered to, the global planner module 202 is configured to find a motion path matrix O (as illustrated in example Algorithm 3 for motion path generation) that correlates to reference path matrix R.

4.9 Waypoint Over Time Specification

To describe collision free traversal of a path near dynamic obstacles over a fixed timespan for global planner module 202, a function $\vec{w}_t = f_w(O, t)$ is defined where $\vec{w}_t$ contains the expected location of a vehicle following motion path O starting from $\vec{w}_1^O$ and $t \in [0, \text{duration}(O)]$ is the duration of time that has transpired.

4.10 Route Optimization Problem

The objective of global planner module 202 is to find the shortest obstruction free path along a sequence of via-points in mission matrix M. The overall problem can be written as $$\vec{x}^* = \arg\min_{\vec{x}} \sum_{i=1}^{r} dist(S(\vec{w}_i^R, \vec{w}_{i+1}^R)) + \sum_{i=1}^{o} dist(S(\vec{w}_i^O, \vec{w}_{i+1}^O))$$

subject to $\vec{x} \geq \vec{x}_{lb}$ $\vec{x} \leq \vec{x}_{ub}$ $R \leftarrow f_R(\vec{x})$ $O \leftarrow f_O(\vec{x})$ $S(\vec{w}_j^O, \vec{w}_{j+1}^O, \alpha) \notin NFZs, \forall \alpha \in [0, 1], \forall j \in \{1, \ldots, o-1\}$ $S(\vec{w}_j^O, \vec{w}_{j+1}^O, \alpha) \notin \text{Terrian}, \forall \alpha \in [0, 1], \forall j \in \{1, \ldots, o-1\}$ $f_w(O, t) \notin \text{Moving\_NFZs}(t),$ where $dist(S(\vec{w}_x, \vec{x}_y))$ is the length of the segment between points $\vec{w}_x$ and $\vec{w}_y$. The objective function $$\left(\vec{x}^* = \arg\min_{\vec{x}} \sum_{k=1}^{r} dist(S(\vec{w}_i^R, \vec{w}_{i+1}^R)) + \sum_{k=1}^{o} dist(S(\vec{w}_i^O, \vec{w}_{i+1}^O))\right)$$

aims to minimize the total length of both the reference and motion path combined. This is done to mitigate potential path artifacts when optimizing exclusively over one. While the reference path is only used for computation of path cost, the motion path is checked for collisions between no-fly zones (NFZ) and terrain. For moving NFZs, the parameterization is written in terms of time over the entire route instead of between individual segments.

5. Global Optimization Via Particle Swarm Optimization

The optimization problem described in Section 4.10 may not be convex. In other words, there may be many local minima, making it difficult to find the true global minimum. This requires that the global optimizer of the global planner module 202 be used to perform the minimization. As one example, particle swarm is utilized as a global optimization function, and the particle swarm has added benefit for its simplicity and performance. It should be appreciated that any other global optimization function can be easily substituted if desired, and particle swarm is illustrated for explanation purposes. Other example global optimization functions may include genetic algorithm, simulated annealing, and ant colony optimization. Further, regarding the algorithm is discussed below.

5.1 Particles Representation

Particle Swarm Optimization (PSO) (reference can be made to the following: J. Kennedy and R. Eberhart, "Particle swarm optimization," Proceedings of ICNN'95—International Conference on Neural Networks, Perth, W A, Australia, 1995, pp. 1942-1948 vol. 4.) requires that a population, or swarm, of candidate solutions $\vec{x}$ be maintained. Each candidate solution is called a particle. Each particle has an associated cost. The particles are moved around the search space according to rules that will be explained in the next section. In the example global planning problem, each particle is a state vector defined in Equation 9 with lower and upper bounds defined in Equations 10 and 11 respectively.

5.2 Particle Swarm Optimization Algorithm

5.2.1 Overview of Basic Particle Swarm

Algorithm 1 below shows a PSO variant that can be utilized by global planner module 202. It is assumed that the input vector $\vec{x}$ has length $n_{var}$ (i.e., $\vec{x} \in \mathbb{R}^{n_{var}}$). The swarm has $n_{particles}$ particles. Particle $i \in \{1, 2, \ldots, n_{particles}\}$ has position $\vec{x}_i$, and it also has a velocity $\vec{v}_i \in \mathbb{R}^{n_{var}}$. As the position of the particle moves around the search space, its best position (i.e., position with lowest cost $f(\vec{x}_i)$) is remembered as $\vec{p}_i$. The best position found by the entire swarm is $\vec{g}$. Vectors $\vec{x}_{lb}$ and $\vec{x}_{ub} \in \mathbb{R}^{n_{var}}$ represent the lower and upper bounds, respectively, on each of the variables. In Algorithm 1, the three parameters $\omega$, $\phi_p$, and $\phi_g$ are each set to the default value of 1, but they can be tuned as desired. Regarding convergence, the Particle Swarm algorithm is considered complete (i.e., termination criteria on line 9) when one of two conditions are met:

1. The maximum number of iterations n iter max is exceeded.
2. More than n_stall_iter_max iterations have passed without improvement in the cost of the solution. The global planner module 202 considers the cost improved only if $f(\vec{x}_{best}) - f(\vec{x}_{current}) > $ stall_threshold.

---

ALGORITHM 1 BASIC PARTICLE SWARM OPTIMIZATION [3]

1: for each particle $i = 1, 2, \ldots, n_{particles}$ do

2: $\quad \vec{x}_i \sim U(\vec{x}_{lb}, \vec{x}_{ub})$

▷Initialize the particle's position with a uniformly distributed random vector

3: $\quad \vec{p}_i \leftarrow \vec{x}_i$

▷Initialize the particle's best known position to it's initial position

4: $\quad$ if $f(\vec{p}_i) < f(\vec{g})$ then

5: $\quad\quad \vec{g} \leftarrow \vec{p}_i$

▷Update the swarm's best known position

6: $\quad$ end if

7: $\quad vi \sim U(-|\vec{x}_{ub} - \vec{x}_{lb}|, |\vec{x}_{vb} - \vec{x}_{lb}|)$ ▷Initialize the particle's velocity 8: end for
9: while a termination criterion is not met do
10: $\quad$ for each particle $i = 1, 2, \ldots, n_{particles}$ do
11: $\quad\quad$ for each dimension $j = 1, 2, \ldots, n_{var}$ do
12: $\quad\quad\quad r_p, r_g \sim U(0,1)$ ▷Pick random numbers
13: $\quad\quad\quad v_{i,j} \leftarrow w v_{i,d} + \Phi_p r_p (p_{i,d} - x_{i,d}) + \Phi_g r_g (g_d - x_{i,d})$ ▷Update the particle's velocity 14: $\quad\quad \vec{x}_i \leftarrow \vec{x}_i + \vec{v}_i$ ▷Update the particle's position

| ALGORITHM 1 BASIC PARTICLE SWARM OPTIMIZATION [3] |
| --- |
| 15:            if $f(\vec{x}_i) < f(\vec{p}_i)$ then |
| 16:                  $\vec{p}_i \leftarrow \vec{x}_i$ |
|                  ▷Update the particle's best known position |
| 17:            if $f(\vec{p}_i) < f(\vec{g})$ then |
| 18:                  $\vec{g} \leftarrow \vec{p}_i$ |
|                  ▷Update the swarm's best known position |
| 19:                end if |
| 20:              end if |
| 21:            end for |
| 22:         end for |
| 23:      end while |

5.2.2 Hybrid PSO Algorithms

In general, particle swarm often returns a solution near the global optimum. However, the global planner module 202 can use a local (convex) optimizer to often improve this solution a non-trivial amount. For this reason, a hybrid algorithm is created by running a local optimizer after particle swarm has terminated. The local optimizer uses the solution from particle swarm as the initial estimation (i.e., guess) and improves on that solution if possible. Examples of various local optimization algorithms that can be used include a gradient-based nonlinear programming solver or a search-based nonlinear programming solver such as Nelder-Mead Simplex Search.

5.2.3 Locust Swarm

Additionally and/or alternatively, Locust swarm algorithms (reference can be made to the following: Stephen Chen, "Locust swarms-a new multi-optima search technique". In 2009 IEEE Congress on Evolutionary Computation, pages 1745-1752. IEEE, 2009) can be utilized by global planner module 202. A Locust swarm algorithm reuses previous swarm solutions in subsequent particle swarms, thus improving the likelihood of finding a reasonably close solution. Locust swarm introduces two new concepts to particle swarm.

1. Instead of just initializing $n_{particles}$ particles by placing them randomly in the search space, the global planner module 202 generates $n_{random}$ random positions in the search space where $n_{random} \gg n_{particles}$. Then, the global planner module 202 evaluates the cost of each random position and only chooses the best $n_{particles}$ positions as particles. In this way, the global planner module 202 starts off the particle swarm with better particles that will more quickly converge to the optimum.

2. The global planner module 202 runs multiple particle swarms in series. The best solution from the previous particle swarm informs the initialization of the position and velocity of particles in subsequent swarms.

5.2.4 Monotonically Contracting Particle Swarm Optimization (MC-PSO)

Through visualization of the particles during runs of Locust Swarm it was observed that subsequent swarms may not necessarily benefit from previous solutions, but may diverge from the best solution found thus far among all subsequent swarms. This is due to algorithm's choice of sampling near the previous swarm solution, while not accounting for the possibility of converging to a worse solution. As a result, subsequent swarms could converge to increasingly worse solutions, as the sampling region is reduced. To address the issues observed in Locust Swarm Optimization, the inventor developed MC-PSO for global planner module 202, borrowing some of the ideas of the former presented, such as choosing the best initial samples and reusing previous swarm solutions.

As depicted below, Algorithm 2 illustrates an implementation of MC-PSO for the global planner module 202. For the sake of clarity and ease of understanding, it is noted that some optimizations are overlooked (or ignored) in order to have a logical flow that is consistent with the algorithms previously discussed. In Algorithm 2, lines 1 through 3 initialize the variables used to track the best swarm solution found thus far and how many swarms have found a solution. A solution is defined to be found by a single swarm if it converges to a viable solution. Non-viable solutions will have a cost of infinity (inf). In Algorithm 2, line 5 computes a scaling factor that will be used when perturbing (moving) samples away from the best swarm solution seen thus far. In Algorithm 2, lines 7 through 11 initialize the set of particle samples. If a solution has yet to be found, the set of particle samples is sampled from a uniform distribution. Otherwise, the set of particle samples is all set to the previous solution. The initial velocities of the particles are chosen in lines 19 through 23. Perturbation of particles away from the previous best swarm solution are controlled (solely) by the scaling of the initial velocities. For this scaling to work as intended, a particle's position is now updated before its velocity on lines 29 through 30 in Algorithm 2. In Algorithm 2, line 41 through 47 update the best swarm solution found thus far and how many swarms were successful in finding a viable solution.

With regard to convergence, the global planner module 202 considers the Monotonically Contracting Swarms algorithm complete (termination criteria on line 4 of Algorithm 2) when one of two conditions are met:

1. The maximum number of swarms $n_{swarms\_max}$ is exceeded.

2. More than $n_{swarms\_max}$ swarms have converged without improvement in the cost of the solution. The cost is considered improved only if $f_{best} - f(\vec{g}) >$ swarm_stall_threshold.

| Algorithm 2 Monotonically Contracting Particle Swarm Optimization (MC-PSO) |
| --- |
| 1:     fbest ← inf |
| 2:     $\vec{g}$ best ← 0 |
| 3:     $n_{swarms\_found} \leftarrow 0$ |
| 4:     while a termination criterion is not met do |

-continued

Algorithm 2 Monotonically Contracting Particle Swarm Optimization (MC-PSO)

5:     perturbation_factor ← 1 · ($n_{swarms\_found}/n_{swarms\_max}$) ▷ Reduce perturbation for each success
6:     for each sample i = 1, 2, ..., $n_{samples}$ do
7:         if fbest = inf then ▷ If no swarm has been found yet
8:             $\vec{x}_i \sim U(\vec{x}_{lb}, \vec{x}_{ub})$ ▷ Initialize the sample's position uniformly
9:         else
10:            $\vec{x}_i \leftarrow g_{best}$ ▷ Set the sample's position to the best found
11:         end if
12:     end for
13:     sort $\vec{x}_0, ..., \vec{x}_{n_{samples}}$: $f(\vec{x}_a) < f(\vec{x}_b)$ ▷ Sort samples by least cost
14:     for each particle i = 1, 2, ..., $n_{particles}$ do
15:         $\vec{p}_i \leftarrow \vec{x}_i$ ▷ Initialize the particle's position from the best sample
16:         if $f(\vec{p}_i) < f(\vec{g})$ then
17:             $\vec{g} \leftarrow \vec{p}_i$ ▷ Update the swarm's best known position
18:         end if
19:         if fbest = inf then ▷ If no swarm has been found yet
20:             $v_i \sim U(-|\vec{x}_{ub} - \vec{x}_{lb}|, |\vec{x}_{ub} - \vec{x}_{lb}|)$ ▷ Initialize the particle's velocity from uniform distribution
21:         else
22:             $v_i \sim U(-|\vec{x}_{ub} - \vec{x}_{lb}|, |\vec{x}_{ub} - \vec{x}_{lb}|)$ ▷ Initialize away from best solution
23:         end if
24:     end for
25:     while a termination criterion is not met do ▷ Individual swarm iteration
26:         for each particle i = 1, 2, ..., $n_{particles}$ do
27:             for each dimension j = 1, 2, ..., $n_{var}$ do
28:                 $r_p, r_g \sim U(0, 1)$ ▷ Pick random numbers
29:                 $\vec{x}_i \leftarrow \vec{x}_i + v_i$ ▷ Update the particle's position
30:                 $v_{i,j} \leftarrow wv_{i,d} + \Phi_p r_p(P_{i,d} - \vec{x}_{i,d}) + \Phi_g r_g(g_d - \vec{x}_{i,d})$ ▷ Update the particle's position
31:                 if $f(\vec{x}_i) < f(\vec{p}_i)$ then
32:                     $\vec{p}_i \leftarrow \vec{x}_i$ ▷ Update the particle's best known position
33:                     if $f(\vec{p}_i) < f(\vec{g})$ then
34:                         $\vec{g} \leftarrow \vec{p}_i$ ▷ Update the swarm's best known position
35:                     end if
36:                 end if
37:             end for
38:         end for
39:     end while
40:     $g \leftarrow$ nelder_mead($\vec{g}$) ▷ Improve solution with Nelder–Mead
41:     if $f(\vec{g}) <$ inf then

| Algorithm 2 Monotonically Contracting Particle Swarm Optimization (MC-PSO) |
| --- |
| 42:        $n_{swarms\_found} \leftarrow n_{swarms\_found} + 1$    ▷ Increment number of successful swarms |
| 43:    end if |
| 44:    if f(g) < fbest then    ▷ If better swarm cost has been found, update best solution |
| 45:        fbest ← f($\overleftarrow{g}$) |
| 46:        $\vec{g}$ best ← $\vec{g}$ |
| 47:    end if |
| 48:    end while |
| 49:    return gbest |

6. Free Waypoint Adjustment

Among a free waypoint's parameters detailed in Section 4, only a few are directly controlled by the optimizer of the global planner module 202 as part of the planning state (described in Section 5). Methods used to populate the remainder of the relevant set of particle samples are detailed below.

6.1 Mission Indices

Prior to optimization, free waypoints are assigned by global planner module 202 to mission waypoint indices $v_i$ as evenly as possible among all segments if the number of segments is less than or equal to (c≥m−1) the free waypoints. When there are fewer free waypoints available, the free waypoints are subdivided among the m−1 segments with the largest distances. This strategy assumes that it is more likely that the path will require a detour over greater distances than shorter ones.

6.2 Altitude

The altitude of a free waypoint is set from the mean altitude of the mission waypoints along its designated segment. In other words, $$h_i^C = \left( h_{v_i^C}^M + h^i x_{v_i C+1} \right) / 2$$

where $h_{v_i^C}^M$ indicates the altitude of a waypoint in M at row $v_i^C$.

6.2.1 Cruise Altitude

When specified, the altitude of all free waypoints could be set to a single cruise speed. This functionality is not currently utilized in the example.

6.3 Speed

The tracked speed of a free waypoint is set as the speed of the second (or subsequent) waypoint along its designated segment, unless that speed is 0. In other words, $$v_i^C = \begin{cases} v_{v_i^{M}C+1} & v_{v_i^{M}C+1} \neq 0 \\ v_{v_i^{M}}^C & \text{otherwise} \end{cases}$$

where a superscript indicates the source matrix, (either C or M) and a subscript indicates the row along that matrix where the variable is defined.

6.3.1 Cruise Speed

When specified, the tracked speed of all free waypoints could be set to a single cruise speed. This functionality is currently not utilized in the example.

7. Motion Path Generation

Given a reference path (e.g., Section 4.6), a motion path (e.g., Section 4.8) is created by stitching together a series of motion primitives that approximately model the dynamics of the target platform with the intent to track the reference path. Motion primitives define each action capable of being taken by aircraft 10. In other words, the global planner module 202 finds motion suitable for aircraft 10 to fly the reference path. As an example, the global planner module 202 is configured to accomplish the process as discussed below. At any given time while tracking the reference path, the vehicle will be expected to either:

1) climb/descend and/or adjust forward speed, and/or
2) perform a turn.

In so doing, the global planner module 202 can reduce the power requirements imposed on a rotorcraft that would otherwise have to reserve enough for both (say turning while climbing). As depicted below, Algorithm 3 describes the procedure with some detail omitted for the sake of brevity and ease of understanding.

To connect motions together, a single point (fi $\vec{r}$ st) is used to track where the next motion primitive will start. On line 3 of Algorithm 3, fi $\vec{r}$ st is copied from the starting point on the reference path. For all remaining points along the reference path, motion primitives are appended to the motion path, culminating in the addition of the last point on line 29 of Algorithm 3. Straight and turn motions will be appended from lines 5 through 24 of Algorithm 3. After attempting to retrieve a set of turn waypoints from the current triplet on line 6 of Algorithm 3, the next operation depends on what getTurnPoints (procedure illustrated in Algorithm 4) are returned. If a set of waypoints were found, they are appended to the motion path on line 13 of Algorithm 3. If it was deemed unnecessary, this procedure is skipped. In either case, an additional intermediate point may be obtained in lines 9 and 16 of Algorithm 3 and added a priori. Points that are added in between turns are considered to be a part of direct segments that may contain changes in either and/or both altitude and velocity. These points may also include the first or last point along a turn. Regardless, if a failure is observed on line 21 of Algorithm 3, it is assumed a turn should have been made, but it was deemed infeasible.

retrieve a set of evenly spaced, turn waypoints, between an ordered triplet of waypoints, as Algorithm 4 depicts. The choice of what turn to use is described below in Algorithm 4, and for the sake of brevity, some detail is omitted.

Algorithm 3 Motion Path Generation

Input: R
Output: O, found
1:    found ← false
2:    R ← adjustReference(R)
3:    first ← R[1]
4:    O ← {first}
5:    for i = 2, ... , r − 1 do
6:      turn_code, turn_points ← getTurnPoints $\left(\overrightarrow{first}, R[i], R[i+1]\right)$
7:      switch turn_code do
8:      case FOUND
9:        int_found, int_$\overrightarrow{points}$ ← getIntermediatePoint $\left(\overrightarrow{first}, turn\_\overrightarrow{points}[1]\right)$
10:       if inter_found then
11:         $O \leftarrow \{O; int\_\overrightarrow{point}\}$
12:       end if
13: 
14:       $O \leftarrow \{O; turn\_\overrightarrow{points}\}$
       first ← turn−$\overrightarrow{points}$[end]
15:      case SKIP
16:        int_found, int_$\overrightarrow{point}$ ← getIntermediatePoint $\left(\overrightarrow{first}, R[i]\right)$
17:       if int_found then
18:         O ← {O; int_pount}
19:       end if
20:       $\overrightarrow{first} \leftarrow \overrightarrow{second}$
21:      case FAILED
22:       return
23:    end for
24:    int_found, int_$\overrightarrow{point}$ ← getIntermediatePoint $\left(\overrightarrow{first}, R[r]\right)$
25:    if inter_found then
26:      $O \leftarrow \{O; int\_\overrightarrow{point}\}$
27:    end if
28:    O ← {O; R[r]}
29:    found ← true

7.1 getTurnPoints

This procedure (getTurnPoints) makes use of the turns library (e.g., Section 8.1) or flight turns module 204 to ALGORITHM 4 GetTurnPoints Input: one, $\overrightarrow{two}$, $\overrightarrow{three}$ Output: ret_code, turn_points 1:    waypoint_type ← $\overrightarrow{two.r}$
2:    angle ← getTurnAngle$\left(one, \overrightarrow{two}, \overrightarrow{three}\right)$
3:    radius ← getTurnRadius$\left(\overrightarrow{two}, v\right)$
4:    switch waypoint_type do
5:    case HARD_VIA
6:      if angle > 30 then
7:        type ← DIRECT_TO
8:      else
9:        type ← TEAR_DROP
10:      end if
11:    case SOFT_VIA
12:      type ← FLY_BY
13:    case FREE
14:      type ← FLY_BY
15:    valid, turn_points, num_points ← turnLibrary $\left(\overrightarrow{one}, \overrightarrow{two}, \overrightarrow{three}, type, radius\right)$
16:    if valid = false & type ≠ SOFT_VIA then
17:      valid, turn_points,num_points ← turnLibrary $\left(\overrightarrow{one}, \overrightarrow{two}, \overrightarrow{three}, TEAR\_DROP, radius\right)$
18:    end if
19:    if valid = false then
20:      ret_code ← FAILURE
21:      return
22:    end if
23:    if num_pts < 2 then
24:      ret_code ← SKIP
25:      return
26:    end if
27:    ret_code ← FOUND Further with respect to turn choice, the choice in what turn is chosen is static as discussed in the example Algorithm 4. It should be appreciated that the logic can be adapted to work with a particular vehicle or decided by the optimizer of the global planner module 202. More on the latter will be discussed in Section 8.2.

Figure 12:
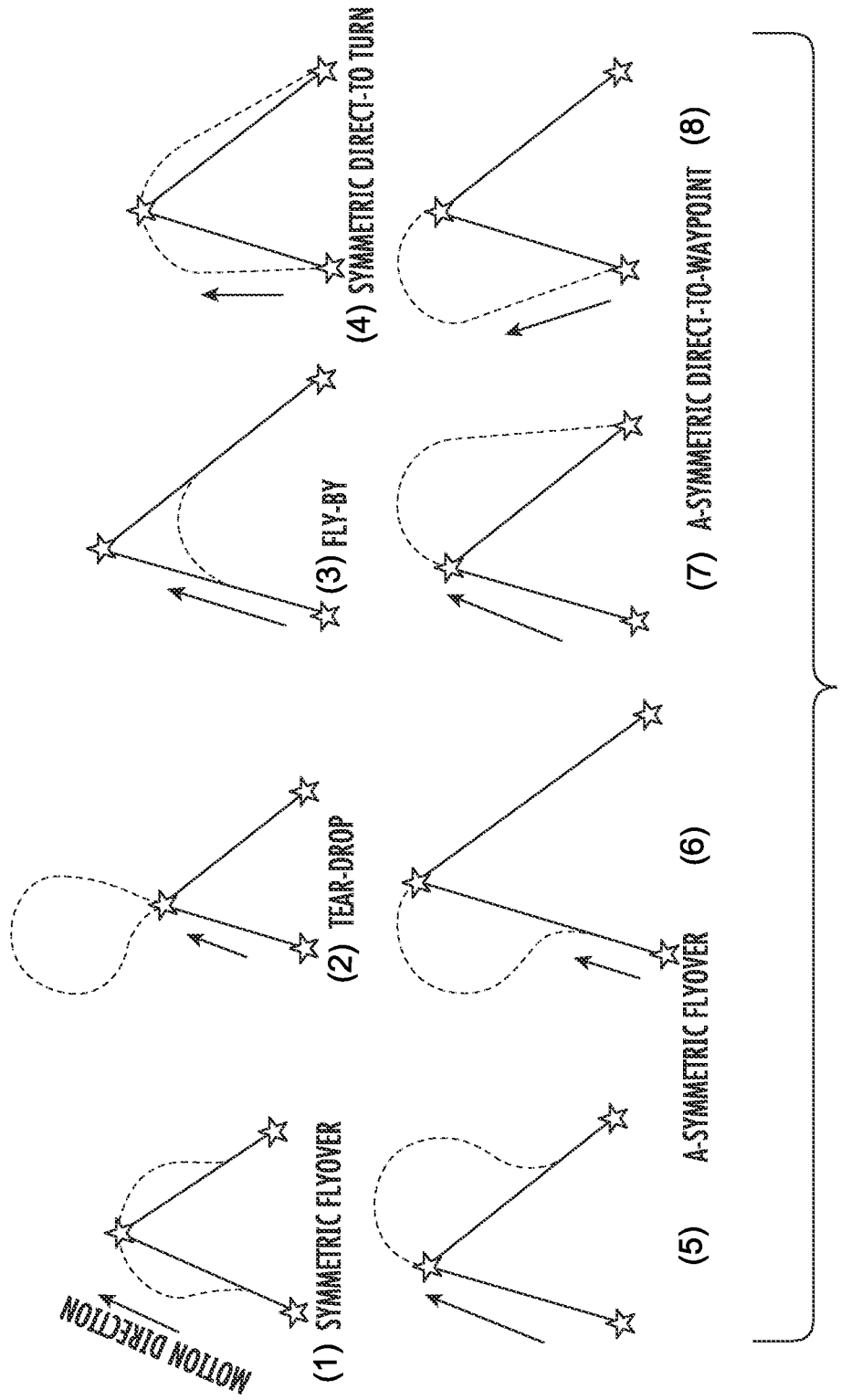
FIG. 12 depicts an example turns library in accordance with one or more embodiments.

All turns are computed between three successive waypoints, with the second waypoint acting as the general location for the turn. In Algorithm 4, lines 1 through 3 retrieve information relevant for a turn such as the type of waypoint it will be based off of, the angle, and turn radius. In Algorithm 4, lines 4 through 14 ascertain the appropriate turn type, based on the waypoint type and turn angle. After all relevant information is obtained, a request is made to the turnLibrary (e.g., flight turns module 204 and/or global planner module 202) to produce the appropriate turn. In case of a failure for certain waypoint types, logic is introduced from lines 16 to 18 of Algorithm 4 to attempt a turn that is more flexible in terms of feasibility requirements. For example, lines 16 to 18 reference the use of a specific type of turn (e.g., teardrop) to account for edge cases where the distances along segments could be too short for the previously chosen turn to fit. Because most turns require some space to fit between segments, a teardrop starts and ends at the same point, as can be seen in FIG. 12. The return code is ascertained from lines 19 through 27 of Algorithm 4. If failure code is returned and if the number of waypoints retrieved is too small, the Algorithm 4 skips them entirely. Methods used are described in more detail below.

In Algorithm 4, the turnLibrary will retrieve a set of evenly spaced waypoints between a given triplet of points, turn type, and turn radius. This method is discussed more in Section 8.1. With respect to getTurnRadius, this is the radius of a circle that is believed to be a conservative approximate of vehicle turn capability, such as for aircraft 10. The getTurnAngle is the angle formed between the three given points (i.e., the given triplet of waypoints).

7.2 getIntermediatePoint

The role of this method of the global planner module 202 is to provide a single waypoint along a segment (between a given pair of waypoints), which marks a change in velocity. The getIntermediatePoint is described in Algorithm 5 below with some detail omitted for the sake of brevity and ease of understanding. On lines 4 through 7 of Algorithm 5, an estimate for the distances needed to adjust speed is calculated and compared to the overall distance to ensure the change is feasible. On lines 8 through 15 of Algorithm 5, an intermediate set of coordinates is found using the distance that needed to be adjusted. In addition, a tracked speed is assigned depending on whether the second waypoint is coming to a stop. This also influences the position of the intermediate point. In Algorithm 5, line 19 retrieves an altitude value that is believed to be reachable following the segment until the intermediate coordinates are reached.

In Algorithm 5, the getDistanceToAdjustSpeed estimates the amount of distance needed to complete speed adjustment between two points, not accounting for their positions. The getDistanceAtUniformAltitude calculates the amount of distance between two points in terms of their positions, assuming both had the same altitude (lowest between the two). In Algorithm 5, the getDistanceAtUniformAltitude calculates the amount of distance between two points in terms of their positions, assuming both had the same altitude (lowest between the two). The getIntermediatePosition retrieves the geospatial coordinates of a point along a segment between two points, by some alpha=[0,1] that is indicative of distance progressed over total segment distance. The getReachableAltitude estimates the altitude achievable by an intermediate waypoint between two others in Algorithm 5.

With respect to the altitude and speed profile, it is noted that in the current example implementation, only a single point is returned marking a change in velocity where the objective is to move between two points without tracking a cruise altitude/speed. In one or more embodiments, this method is altered to return an appropriate number of intermediate waypoints for a trapezoid altitude and speed profile.

Algorithm 5 getIntermediatePoint

Input: $\vec{}_{one}$, $\vec{}_{two}$

Output: found, int_$\vec{}_{point}$

-continued

Algorithm 5 getIntermediatePoint

1: found = false
2: if first. v = second. v then return
3: end if
4: dist_adjust ← getDistanceToAdjustSpeed$\left(\vec{}_{one}, \vec{}_{two}\right)$
5: dist$_{total}$ ← getDistanceAtUniformAltitude$\left(\vec{}_{one}, \vec{}_{two}\right)$
6: if dist_total < dist_adjust then
7:     return
8: end if
9: if two. v ≠ 0 then
10:    alpha ← 1 − dist_adjust/dist_total
11:    speed ← $\overrightarrow{two.v}$
12: else
13:    alpha ← 1 − dist_adjust/dist_total
14:    speed ← one. v
15: end if
16: lat, lan ← get IntermediatePosition$\left(\vec{}_{one}, \vec{}_{two}, alpha\right)$
17: int_$\vec{}_{point}$ · μ = lat
18: int_$\vec{}_{point}$ · λ = lon
19: int_$\vec{}_{point}$ · v = speed
20: int_$\vec{}_{point}$ · h = getReachableAltitude$\left(\vec{}_{one}, \vec{}_{two}, \text{int}\_\vec{}_{point}\right)$
21: found ← true

8. Optimizing Global Routes for Aircraft Via Library of Turns

The global planner module 202 generates an obstacle free sequence of route segments for the aircraft 10 to fly. To enforce a desired turn type for flying between two segments, the global planner module 202 includes turn waypoints of a specific turn type. There could be cases where the specified turn type may not be the most optimal or feasible for a given reference path. To address the issue of the specified turn type not being the most optimal or feasible for a given reference path, one or more embodiments incorporate the issue of turn type into the optimization problem of the global planner module 202. The output of the optimization of the global planner module 202 is then the optimal route segments and optimal turn types for each pair of route segments.

Figure 11:
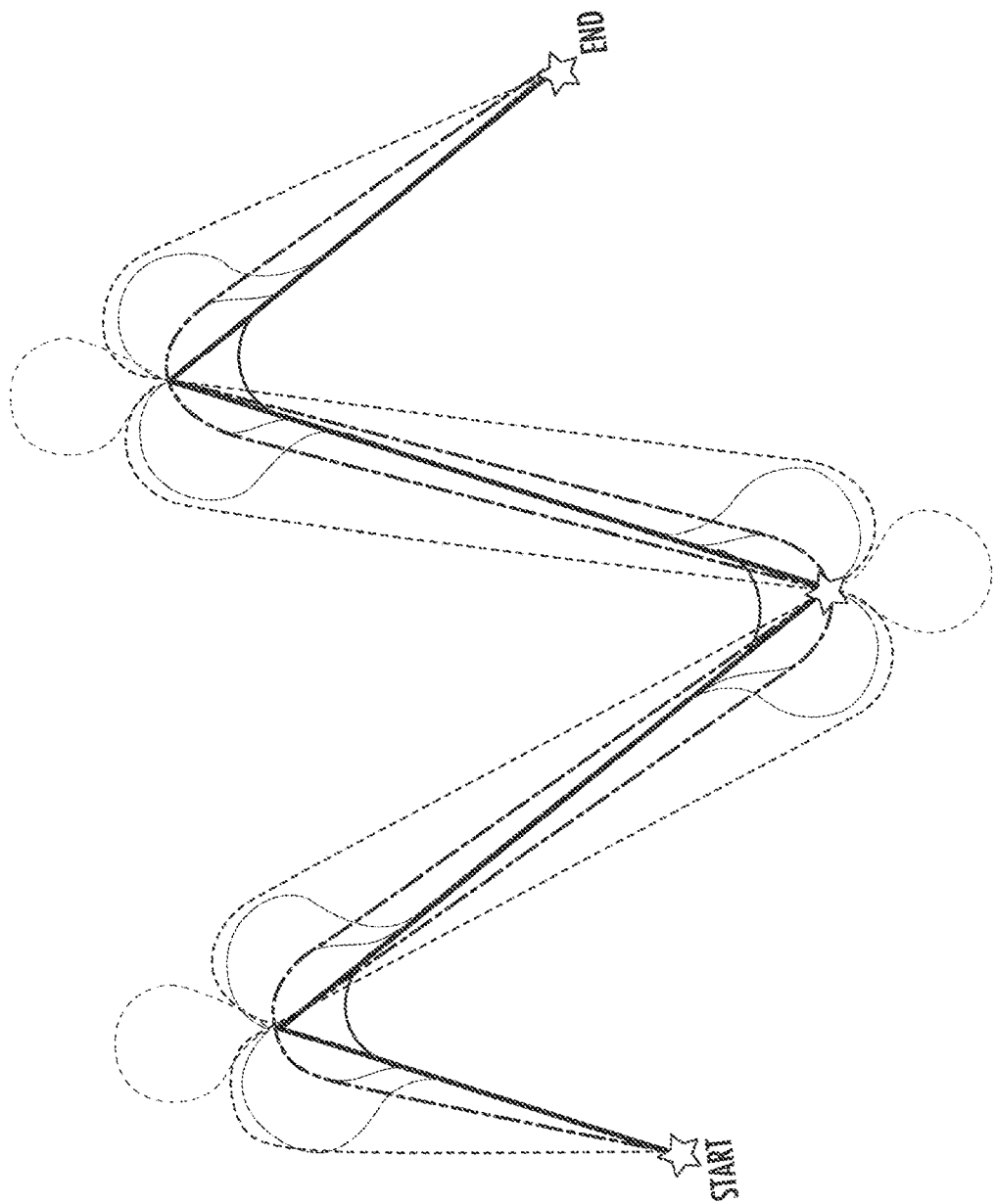
FIG. 11 depicts a route with four segments overlaid with multiple turn choices in accordance with one or more embodiments.

This approach can also be adopted for cases where the route plan is created manually. In many cases, the ground station operator or the pilot assigns the aircraft routes. In this case, the optimization of global planner module 202 and/or flight turns module 204 optimizes (only) for the turn types and not for the route segments. For instance, FIG. 11 depicts a route with four segments overlaid with multiple turn choices. Regardless if the global route is generated by global planner module 202 or input to the global planner module 202 (or flight turns module 204), the best combination of turn types can be chosen by the optimization of global planner module 202 and/or flight turns module 204.

8.1 Library of Turns

As depicted in FIG. 12, the turnLibrary (e.g., global planner module 202 and/or flight turns module 204) computes a set of waypoints that makeup a turn between a given ordered triplet (e.g., triplet of waypoints). Examples of such turns in the library of turns 206 are depicted in FIG. 12, and each type of turn may be associated with certain flight constraints. Further, it should be appreciated that the turn types can be optimized based on various criteria and should not be limited. Examples of criteria for selecting turn types can include any one or more of the following (which should not be contradictory) the shortest, safest, preferred turn type, fastest turn type, minimum time, minimum fuel, maximum time, etc.

8.2 Optimizing Over Turns

As discussed earlier, the logic used to dictate the choice of turn type does not have to be static. The static turn type may not be the most optimal or feasible for a given reference path R. Using global planner module 202 and/or flight turns module 204, a means to address this issue is to incorporate the turn type into the original optimization problem discussed in Section 4.10. As turn types can logically be represented as integers, this would change the problem into a mixed-integer programming type. The following sections describe changes to the approach discussed thus far thereby enabling this type of optimization in global planner module 202 and/or flight turns module 204. In one or more embodiments, although optimizing over turns may be described and integrated with the preparation of the global route in examples below for ease of understanding, it should be appreciated that optimizing the turn type can be performed separate or independent from generation of the global route.

8.2.1 State Specification With Turns Specified

In order to ease understanding and to reuse of much of the previously described algorithms/data structures (such as, for example, Particle Swarm) described in this document, selected turn types (encoded as $q^R$) are appended to the end of the state vector defined in Section 4.5. One or more embodiments are not meant to be limited to using Particle Swarm and other algorithms/data structures discussed above. The state vector originally defined in Equation 9 is redefined as $$\vec{x} = \begin{bmatrix} \mu_1^C \\ \lambda_1^C \\ \mu_2^C \\ \lambda_2^C \\ \vdots \\ \mu_c^C \\ \lambda_c^C \\ \delta_1^B \\ \theta_1^B \\ \delta_2^B \\ \theta_2^B \\ \vdots \\ \delta_b^B \\ \theta_b^B \\ q_2^R \\ \vdots \\ q_{r-1}^R \end{bmatrix} \quad (18)$$

where $q_i^R$ specifies the turn type to use near the waypoint at row i in R. Since a turn is only between triplets of waypoints, there is no need to specify a turn type near the first or last waypoint.

The upper and lower bounds in Equations 10 and 11 are redefined as $$\vec{x}_{lb} = \begin{bmatrix} \mu_{min} \\ \lambda_{min} \\ \vdots \\ \times c \\ 0 \\ 0 \\ \times b \\ 1 \\ \vdots \\ \times r-2 \end{bmatrix} \vec{x}_{ub} = \begin{bmatrix} \mu_{max} \\ \lambda_{max} \\ \vdots \\ \times c \\ d_1^B \\ 2\pi \\ d_2^B \\ 2\pi \\ \vdots \\ d_b^B \\ 2\pi \\ q_{max} \\ \vdots \\ \times r-2 \end{bmatrix} \quad (19)$$

where 1 and $q_{max}$ are the minimum and maximum integer values associated with a turn type. For example, FIG. 12 shows various turn types within the turn library where $q_{max}=8$.

8.2.2 Route Optimization Problem With Turns Specified

To work with turn types, an additional constraint is appended to the optimization problem described in Section 4.10 for global planner module 202. The problem then becomes the following:

$$\vec{x}^* = \arg\min_{\vec{x}} \sum_{i=1}^{r} dist(S(\vec{w}_i^R, \vec{w}_{i+1}^R)) + \sum_{i=1}^{o} dist(S(\vec{w}_i^O, \vec{w}_{i+1}^O))$$

subject to $\vec{x} \geq \vec{x}_{lb}$ $\vec{x} \leq \vec{x}_{ub}$ $R \leftarrow f_R(\vec{x})$ $O \leftarrow f_O(\vec{x})$ $S(\vec{w}_j^O, \vec{w}_{j+1}^O, \alpha) \notin NFZs, \forall \alpha \in [0, 1], \forall j \in \{1, \ldots, o-1\}$ $S(\vec{w}_j^O, \vec{w}_{j+1}^O, \alpha) \notin \text{Terrian}, \forall \alpha \in [0, 1], \forall j \in \{1, \ldots, o-1\}$ $f_w(O, t) \notin \text{Moving\_NFZs}(t)$ $q_k^R \in \{1, \ldots, q_{max}\}, \forall k \in \{2, \ldots, r-1\}$ where the last constraint enforces that all turn type variables are to be assigned to an integer belonging to a set where each is indicative of a turn type.

8.2.3 Motion Path Generation With Turns Specified

To incorporate optimization turn choice into the motion generation process of global planner module 202, Algorithms 3 and 4 discussed in Section 7 require slight modifications. These modifications are described in Algorithm 6 and Algorithm 7 below, respectively where changes are highlighted by bold comments. In Algorithm 6, selected turn types are included as input, and each turn type is passed to getTurnPoints on line 6. In Algorithm 7, since the turn type is specified as input, all the original turn logic described on lines 4 through 18 in Algorithm 4 is now removed.

| ALGORITHM 6 motion path generation with turns specified |
| --- |

Input: R, q2,...,qt-1 ▷Turn types selected now provided as additional input
Output: O, found 1: found ← false
2: R ← adjustReference(R)
3: first ← R[1]
4: O ← {first}
5: for i = 2,...,r − 1 do
6: $\quad$ turn_code, turn_points ← getTurnPoints$\left(\vec{first}, R[i], R[i+1], qi\right)$ $\quad$ Turn type is now passed
7: $\quad$ switch turn_code do
8: $\quad\quad$ case FOUND
9: $\quad\quad\quad$ int_found, int_point ← getIntermediatePoint$\left(\vec{first}, \vec{turn\_points}[l]\right)$
10: $\quad\quad\quad$ if inter_found then
11: $\quad\quad\quad\quad$ $O \leftarrow \left\{O; \vec{int\_point}\right\}$
12: $\quad\quad\quad$ end if
13: $\quad\quad\quad$ $O \leftarrow \left\{O; \vec{turn\_points}\right\}$
14: $\quad\quad\quad$ $\vec{first} \leftarrow$ turn_points[end]
15: $\quad\quad$ case SKIP
16: $\quad\quad\quad$ int_found, $\vec{int\_point}$ ← getIntermediatePoint$\left(\vec{first}, R[i]\right)$
17: $\quad\quad\quad$ if inter_found then
18: $\quad\quad\quad\quad$ $O \leftarrow \left\{O; \vec{int\_point}\right\}$
19: $\quad\quad\quad$ end if
20: $\quad\quad\quad$ $\vec{first} \leftarrow \vec{second}$
21: $\quad\quad$ case FAILED
22: $\quad\quad\quad$ return
23: end for
24: int_found, $\vec{int\_point}$ ← getIntermediatePoint$\left(\vec{first}, R[r]\right)$
25: if inter_found then
26: $\quad$ $O \leftarrow \left\{O; \vec{int\_point}\right\}$
27: end if
28: O ← {O; R[r]}
29: found ← true

| ALGORITHM 7 get TurnPoints with Turns Specified |
| --- |

Input: $\vec{one}, \vec{two}, \vec{three}$, type

▷Turn type provided as additional input

Output: ret_code, $\vec{turn\_points}$

*-continued*

| ALGORITHM 7 get TurnPoints with Turns Specified |
| --- |

Figure 13:
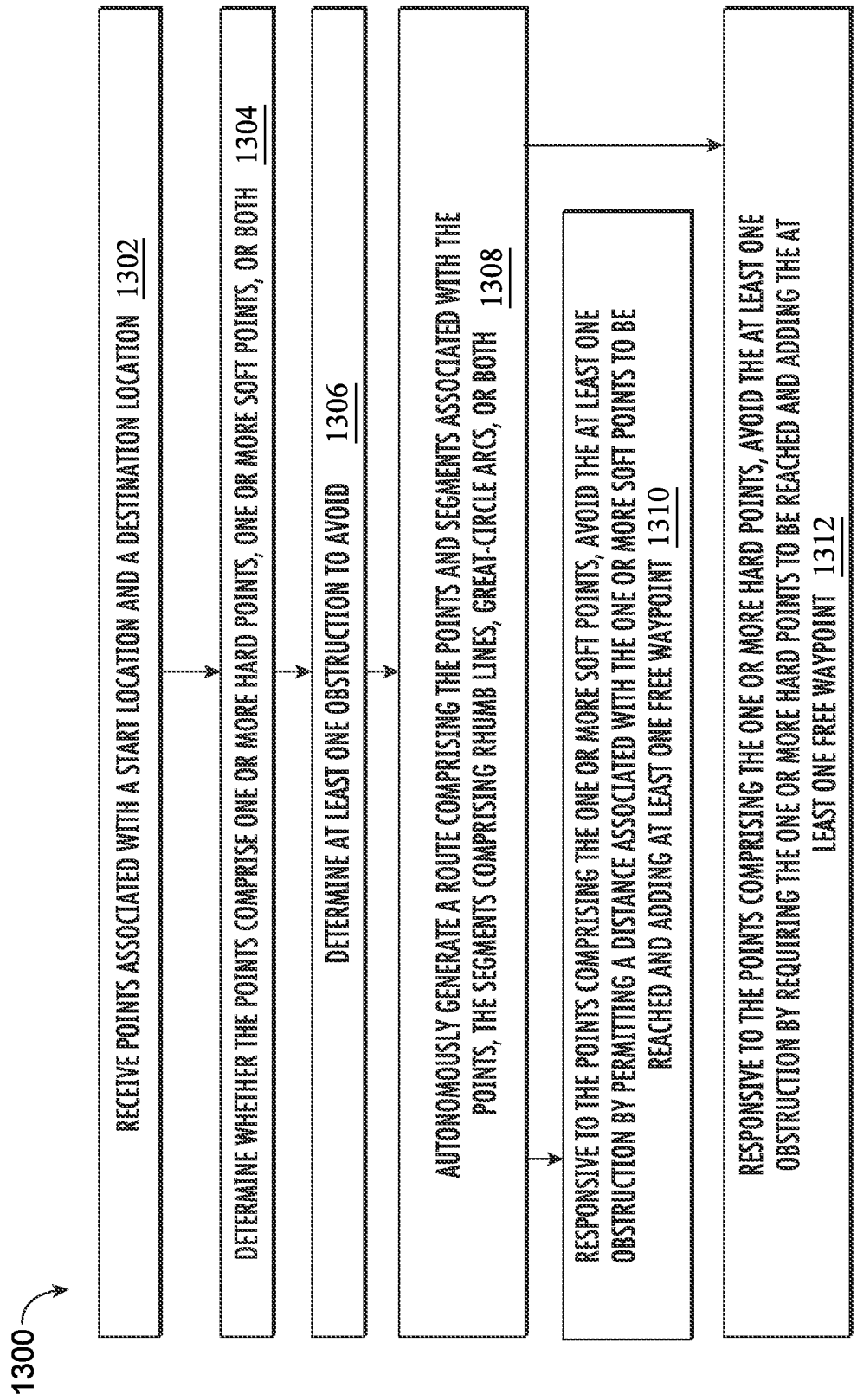
FIG. 13 depicts a flow chart of a method for autonomous global route planning among obstacles and control of an aircraft in accordance with one or more embodiments.

1: $\quad$ waypoint_type ← $\vec{two}$.
2: $\quad$ angle ← getTurnAngle$\left(\vec{one}, \vec{two}, \vec{three}\right)$ -continued ALGORITHM 7 get TurnPoints with Turns Specified 3:    radius ← getTurnRadius$\left(\underset{two}{\rightarrow}.v\right)$ 4:    valid, turn_points, num_points ← turnLibrary$\left(\underset{one}{\rightarrow}, \underset{two}{\rightarrow}, \underset{three}{\rightarrow},\right)$ type, radius) ▷Turn logic removed
5:    if valid = false then
6:        ret_code ← FAILURE
7:        return
8:    end if
9:    if num_pts < 2 then
10:       ret_code ← SKIP
11:       return
12:    end if
13:    ret_code ← FOUND Moving away from the section headings, FIG. 13 depicts a flow chart of a method 1300 for autonomous global route planning among obstacles (e.g., no-fly zones, terrain, etc.) and control of aircraft 10 using global planner module 202 (and flight turns module 204) in accordance with one or more embodiments. At block 1302, the global planner module 202 is configured to receive points associated with a start location and a destination location. For example, the points can be waypoints such as via-points input by the operator using a graphical user interface of global planner module 202. At block 1304, the global planner module 202 is configured to determine whether the points comprise one or more hard points (e.g., hard via-points), one or more soft points (e.g., soft via-points), or both. At block 1306, the global planner module 202 is configured to determine at least one obstruction to avoid (if any). Obstructions are not a requirement, but a constraint provided, if they exist. In the absence of obstructions, a generated route is still required to ensure conformance to vehicle dynamic constraints. At block 1308, the global planner module 202 is configured to autonomously generate a global route comprising the points and segments associated with the points, the segments comprising rhumb lines, great-circle arcs, or both. Generating the route comprises, responsive to the points comprising the one or more soft points, avoiding the at least one obstruction by permitting a distance associated with the one or more soft points to be reached and adding at least one free waypoint at block 1310. Generating the route comprises, responsive to the points comprising the one or more hard points, avoiding the at least one obstruction by requiring the one or more hard points to be reached and adding the at least one free waypoint at block 1312. The one or more free waypoints are utilized by the global planner module 202 to avoid the obstacle.

Further, autonomously generating the route comprises the global planner module 202 selecting the route from candidate routes. For example, the candidate routes can be represented as particles in a swarm optimization, and the location of the particles can be moved to optimize the swarm. Autonomously generating the route comprises the global planner module 202 selecting the route from candidate routes based on an optimization. The optimization comprises the global planner module 202 iterating through the candidate routes based on costs for each of the candidate routes. The route is optimized as the shortest path while accounting for whether the points comprise the one or more hard points, the one or more soft points, or both and avoiding the at least one obstruction. Use of the rhumb lines, the great-circle arcs, or both is selected in advance via a graphical user interface of global planner module 202.

The global planner module 202 (and/or flight turns module 204) is configured to optimize turn types associated with the segments. The global planner module 202 (and/or flight turns module 204) is configured to select a turn type associated with the segments based on a shortest distance. The global planner module 202 (and/or flight turns module 204) is configured to autonomously control and/or cause the FCC 75 to autonomously control a vehicle (e.g., aircraft 10) on the global route.

FIG. 14 depicts a flow chart of a method 1400 for autonomously optimizing turns in a global route among obstacles (e.g., no-fly zones, terrain, etc.) and control of aircraft 10 using turns module 204 and/or global planner module 202 in accordance with one or more embodiments. At block 1402, the turns module 204 and/or global planner module 202 is configured to receive a global route comprising points and segments associated with the points. At block 1404, the turns module 204 and/or global planner module 202 is configured to access a turns library (e.g., library of turns 206). At block 1406, the turns module 204 and/or global planner module 202 is configured to select turn types from the turns library (e.g., library of turns 206) in accordance with whether the points comprise one or more hard points, one or more soft points, or both. Further, a subset of the turn types in the turns library (e.g., library of turns 206) are selectable for the one or more hard points. The hard points require turn types in which the turn forces aircraft 10 to fly directly through, over, and/or to the hard point. For example, hard via-points can be used with turn types 1, 2, and 4-8 in FIG. 12. Any of the turn types in the library of turns 206 (e.g., turn types 1-8 in FIG. 12) are selectable for the one or more soft points. Soft points can utilize any turn type because the aircraft 10 can fly within the radius of the soft point, and the aircraft 10 is not required to fly directly through, over, and/or to soft point. The segments comprise rhumb lines, the great-circle arcs, or both. Selecting the turn types from the turns library (e.g., library of turns 206) comprises the turns module 204 and/or global planner module 202 selecting the turn types based on a shortest distance for the global route. The turns module 204/global planner module 202 is configured to autonomously control and/or cause the FCC 75 to autonomously control a vehicle (e.g., aircraft 10) on the global route.

Now, turning to the details of FIG. 3, a schematic of an example computing system 312 having functions and features utilized according to one or more embodiments. The computer system 312 can be operational with numerous other general purpose or special purpose computing system environments or configurations. The computer system 312 can be representative of various types of computer systems on which operations and functions can run in the aircraft 10. The functions and capabilities of computing system 312 can be utilized in FIGS. 1-14 to implement one or more features of the flight control system 70 including flight control computer 75, processing system 90, global planner module 202, flight turns module 204, library of flight turns 206, etc., according to embodiments.

Computer system 312 may be described in the general context of computer system-executable instructions, such as program modules, being executed by a computer system. Generally, program modules may include routines, programs, objects, components, logic, data structures, and so on that perform particular tasks or implement particular abstract data types. Computer system 312 may be practiced in distributed cloud computing environments where tasks are performed by remote processing devices that are linked through a communications network. In a distributed cloud computing environment, program modules may be located in both local and remote computer system storage media including memory storage devices.

The components of computer system 312 may include, but are not limited to, one or more processors or processing units 316, a system memory 328, and a bus 318 that couples various system components including system memory 328 to processor 316. Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 312 typically includes a variety of computer system readable media. Such media may be any available media that is accessible by computer system 312, and it includes both volatile and non-volatile media, removable and non-removable media. The system memory 328 can include computer system readable media in the form of volatile memory, such as random access memory (RAM) 330 and/or cache memory 332. Computer system 312 may further include other removable/non-removable, volatile/non-volatile computer system storage media. By way of example only, storage system 334 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. Memory 328 may include at least one program product having a set (e.g., at least one) of program modules that are configured to carry out the functions of embodiments.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments as described herein.

Computer system 312 may also communicate with one or more external devices 314 such as a keyboard, a pointing device, a touch screen display 324, etc.; one or more devices that enable a user to interact with computer system 312; and/or any devices (e.g., network card, modem, etc.) that enable computer system 312 to communicate with one or more other computing devices. Such communication can occur via Input/Output (I/O) interfaces 322. Still yet, computer system 312 can communicate with one or more networks such as a local area network (LAN), a general wide area network (WAN), and/or a public network (e.g., the Internet) via network adapter 320. As depicted, network adapter 320 communicates with the other components of computer system 312 via bus 318. It should be understood that although not shown, other hardware and/or software components could be used in conjunction with computer system 312. Examples, include but are not limited to: microcode, device drivers, redundant processing units, external disk drive arrays, RAID systems, tape drives, and data archival storage systems, etc.

Embodiments may be a system, a method, and/or a computer program product at any possible technical detail level of integration. The computer program product may include a computer readable storage medium (or media) having computer readable program instructions thereon for causing a processor to carry out embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform embodiments.

Embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate possible implementations of fabrication and/or operation methods according to various embodiments of the present invention. Various functions/operations of the method are represented in the flow diagram by blocks. In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. By way of example, aspects of the invention can be used in other forms of aircraft, including coaxial aircraft, tilt rotor aircraft and fixed wing aircraft. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for route planning, the method comprising:
    receiving, by one or more processors of an autonomous aerial vehicle, points associated with a start location and a destination location;
    determining, by the one or more processors, that the points comprise one or more hard points and one or more soft points, a hard point representing a first location through which a route is to pass and a soft point representing a second location associated with a region, defined by a corresponding non-zero radius or distance from the second location, through which the route is to pass;
    determining, by the one or more processors, at least one obstruction to avoid;
    generating, by the one or more processors, the route comprising the points and segments associated with the points, wherein generating the route comprises:
        adding, responsive to the determination to avoid the at least one obstruction, at least one free waypoint to cause the autonomous aerial vehicle to avoid the at least one obstruction by permitting a distance associated with the one or more soft points to be reached and requiring the one or more hard points to be reached,
        determining, based on at least one of the points, a respective target speed for the autonomous aerial vehicle at the at least one free waypoint, and
        selecting, using a particle swarm function, a reference route from a plurality of candidate routes, each candidate route represented as a particle in the particle swarm function, and
        generating, using a set of motion primitives, the route for the autonomous aerial vehicle based on the reference route and flight capabilities of the autonomous aerial vehicle; and
    navigating, by the one or more processors, the autonomous aerial vehicle along the route to avoid the at least one obstruction.

2. The method of claim 1, wherein generating the route comprises selecting, by the one or more processors, the route from candidate routes.

3. The method of claim 1, wherein the particle swarm function comprises iterating, by the one or more processors, through the plurality of candidate routes based on costs for each of the plurality of candidate routes.

4. The method of claim 1, wherein the route is optimized as a shortest path while accounting for the points comprising the one or more hard points and the one or more soft points, and avoiding the at least one obstruction.

5. The method of claim 1, wherein the set of motion primitives comprises one or more rhumb lines, great-circle arcs, or both.

6. The method of claim 1, further comprising optimizing, by the one or more processors, turn types associated with the segments.

7. The method of claim 1, further comprising selecting, by the one or more processors, a turn type associated with the segments based on a shortest distance.

8. A system comprising:
   a processor of an autonomous aerial vehicle; and
   memory coupled to the processor and comprising computer-executable instructions that, when executed by the processor, cause the processor to perform operations comprising:
   receiving points associated with a start location and a destination location;
   determining that the points comprise one or more hard points and one or more soft points, a hard point representing a first location through which a route is to pass and a soft point representing a second location associated with a region, defined by a corresponding non-zero radius or distance from the second location, through which the route is to pass;
   determining at least one obstruction to avoid; and
   generating the route comprising the points and segments associated with the points, wherein generating the route comprises:
   adding, responsive to the determination to avoid the at least one obstruction, at least one free waypoint to cause the autonomous aerial vehicle to avoid the at least one obstruction by permitting a distance associated with the one or more soft points to be reached and requiring the one or more hard points to be reached,
   determining, based on at least one of the points, a respective target speed for the autonomous aerial vehicle at the at least one free waypoint, and
   selecting, using a particle swarm function, a reference route from a plurality of candidate routes, each candidate route represented as a particle in the particle swarm function, and
   generating, using a set of motion primitives, the route for the autonomous aerial vehicle based on the reference route and flight capabilities of the autonomous aerial vehicle; and
   navigating the autonomous aerial vehicle along the route to avoid the at least one obstruction.

9. The system of claim 8, wherein the particle swarm function comprises iterating through the plurality of candidate routes based on costs for each of the plurality of candidate routes.

10. The system of claim 8, wherein the route is optimized as a shortest path while accounting for the points comprising the one or more hard points and the one or more soft points, and avoiding the at least one obstruction.

* * * * *